(12) United States Patent
Clauer et al.

(10) Patent No.: US 6,483,578 B1
(45) Date of Patent: Nov. 19, 2002

(54) MECHANICAL GAUGES FOR QUALITY ASSURANCE OF LASER PEENING

(75) Inventors: Allan H. Clauer, Worthington, OH (US); Steven M. Toller, Dublin, OH (US); Jeff L. Dulaney, Dublin, OH (US); David F. Lahrman, Powell, OH (US)

(73) Assignee: LSP Technologies, Inc., Dublin, OH (US)

(*) Notice: Subject to any disclaimer, the term of this patent is extended or adjusted under 35 U.S.C. 154(b) by 46 days.

(21) Appl. No.: 09/592,534

(22) Filed: Jun. 12, 2000

(51) Int. Cl.[7] ............................. G01J 1/00; C21D 1/54
(52) U.S. Cl. ........................... 356/213; 148/508
(58) Field of Search ........................ 356/213, 218, 356/219; 148/508, 510, 900, 903, 565; 428/614

(56) References Cited

U.S. PATENT DOCUMENTS

| | | | | |
|---|---|---|---|---|
| 5,951,790 A | * | 9/1999 | Mannava et al. | 148/510 |
| 6,183,882 B1 | * | 2/2001 | Mannava et al. | 428/614 |
| 6,254,703 B1 | * | 7/2001 | Sokol et al. | 148/508 |

* cited by examiner

*Primary Examiner*—Michael P. Stafira
(74) *Attorney, Agent, or Firm*—Randall J. Knuth

(57) ABSTRACT

A method and apparatus for measuring the quality of a laser peening process, which includes a test element, a mount for the test element, wherein the test element is mounted at a preselected point in the anticipated path of a laser pulse, the laser pulse irradiates the test element, the deflection of the test element is measured in the direction substantially perpendicular and away from the impacted surface of the test element, and the deflection measurement is compared to a previously generated chart showing the relationship between characteristics of test elements and desired material properties.

25 Claims, 19 Drawing Sheets

MECHANICAL GAUGES FOR QUALITY ASSURANCE OF LASER PEENING

This invention was made with United States Government support under Contract No. F33615-98-C-5150 awarded by the Department of the Air Force. The United States Government has certain rights to this invention.

BACKGROUND OF THE INVENTION

1. Field of the Invention

This invention relates to a method and apparatus for maintaining quality control in a laser peening apparatus, and more particularly, to a method and apparatus using test elements that will deflect when subjected to a laser pulse for ascertaining the magnitude of the impulse associated therewith.

2. Description of the Related Art

Laser shock processing, or laser shock peening, or laser peening, as it is also referred to, is a process for producing a region of deep compressive residual stresses imparted by laser pulses directed onto the surface area of a workpiece. Laser shock processing is an effective method of increasing fatigue resistance in metals by treating fatigue critical regions. For a more thorough background in the prior history of laser shock processing, a reference can be made to U.S. Pat. Nos. 5,131,957 and 5,741,559, such patents are explicitly hereby incorporated by reference.

Laser shock processing, as understood in the art and used herein, means utilizing a laser beam from a laser beam source to produce a strong localized compressive force on a portion of a surface by producing an explosive force by instantaneous ablation or vaporization of a painted, coated, or un-coated surface. Laser peening has been utilized to create a compressively stressed layer in the subsurface of a workpiece, thereby considerably increasing the resistance of the workpiece to fatigue failure. Laser shock processing typically utilizes two overlays: a transparent overlay (usually water) and an opaque overlay, typically an oil-based, acrylic-based, or water-based paint or tape. Laser shock processing can also utilize only a transparent overlay on a bare surface. During processing, a laser beam is directed to pass through the transparent overlay and is absorbed by the opaque overlay or bare surface, causing vaporization of a portion of the opaque overlay or bare surface, which results in rapid plasma formation and the generation of a high amplitude shock wave. The shock wave cold works the surface of the workpiece and creates compressive residual stresses, which provide an increase in fatigue resistance properties of the part. A workpiece may be processed by producing a matrix of spots that cover all or part of the fatigue-critical zone of the part.

Laser shock processing is being used for many applications within gas turbine engines, such as leading and trailing edges of fan and compressor airfoils. These applications, as well as others, are in need of efficient quality assurance testing during production runs using laser shock processing. The quality of laser shock processing depends upon the quality of the laser beam, the plasma plume, and subsequently the resultant shock wave that produces the residual compressive stresses. It also depends on the coupling of the laser beam to the opaque overlay or surface.

For these reasons, during laser shock processing, several parameters of the laser beam, such as temporal profile, spatial profile, and beam energy are desirably measured for each laser shot. These parameters provide information about the quality of the laser beam and indirectly provide a potential metric of a plasma plume characteristic or the shock wave magnitude, i.e., the pressure generated by the plasma plume is a function of the characteristics of the laser beam. Furthermore, the pressure profile of the shock wave in the workpiece is a function of the plasma plume characteristics. However, the information about the quality of the laser beam does not provide direct information about the characteristics of the plasma plume or the shock wave.

Conventional methods of assessing the quality of laser shock processing such as high cycle fatigue testing of laser shock peened components provide sufficient measures, however, they are time consuming and costly. Furthermore, these methods are not acceptable for continuous production since it requires terminating the processing while the fatigue test results are acquired.

A method disclosed in U.S. Pat. No. 5,951,790, entitled "Method of Monitoring and Controlling Laser Shock Peening Using An In Plane Deflection Test Coupon" measures the quality of laser shock processing. However, this method requires multiple laser shots in the form of a pattern to generate sufficient in-plane deflection in the gauge. These multiple shots require time to set up and apply the pattern. The amount of in-plane deflection generated by this technique is relatively small, requiring an instrument to measure small deflections with a high degree of precision.

SUMMARY OF THE INVENTION

The present invention provides a fast, reliable, and efficient method of measuring the quality of laser shock processing using only a single laser shot in each test. According to one form of the present invention, each test is performed with a mechanical gauge that measures the impact produced by a plasma plume ignited by the laser pulse. The mechanical gauge can be formed in the shape of a strip, or a sheet, or any other shape that can provide for a measurable deflection in the direction substantially perpendicular to and away from the impacted surface.

According to one preferred embodiment of the invention, a gauge for ensuring the proper operation of a laser shock processing system comprises a test element, and a mounting means for holding the test element such that a portion of the test element is in the anticipated path of a laser pulse, wherein the test element sustains a deflection in the direction substantially perpendicular to and away from the impacted surface when subjected to a single laser pulse, the deflection being indicative of the magnitude of the shock wave. The test element is preferably formed in the shape of a strip, or in the shape of a sheet.

According to one form of the invention, the test element is coated with a first overlay and a second overlay, the first overlay being an opaque material, such as paint or tape. The second overlay is transparent, and typically comprised of water. The thickness of the second overlay has a significant effect on the amount of deflection in the test element when all other processing variables are held constant. The thicker the second overlay, the greater the amount of deflection. In this embodiment, the thickness of the second overlay is controlled. In the embodiment utilizing a strip, the mounting means of the invention comprises a means for gripping one end of the test element while positioning the second end of the test element in the anticipated path of the laser pulse. In the sheet embodiment of the invention, the mounting means comprises a base having a recess, wherein the test element is positioned over the recess and in the anticipated path of the laser pulse. A recess can be any portion of the base that does not contact the test element including, but not limited to, a hole, a notch, a groove, and the unsupported area below a test element that overhangs the base.

In an alternative embodiment of the invention, a method of measuring the quality of laser shock processing comprises the steps of mounting a test element in the anticipated path of the laser pulse, laser peening the test element with a single laser pulse, measuring the deflection of the test element in the direction substantially perpendicular to and away from the impacted surface, and comparing the deflection measurement to a previously generated measurement data set. The previously generated measurement data set includes at least one value selected from the group including test element dimensions, test element material composition, second overlay thickness, laser pulse duration, the laser-pulse rise time, test element deflection measurement, laser power density, laser pulse energy, imparted residual stress in a workpiece, fatigue strength of a workpiece, fatigue life of a workpiece, and shock wave magnitude.

In yet another embodiment of the invention, a method of measuring the quality of laser shock processing comprises the steps of generating a data set; mounting a test element in the anticipated path of the laser pulse; selecting the second overlay thickness; irradiating the test element with a laser pulse; measuring the deflection of the test element in the direction substantially perpendicular to and away from the impacted surface; and comparing the deflection measurement to the data set. In this embodiment of the invention, the data-set generating step includes the steps of selecting a test element with desired dimensions and material composition; mounting the test element in the anticipated path of the laser pulse; selecting the second overlay thickness; irradiating the test element with a laser pulse having a selected pulse duration; measuring the deflection of the test element; and correlating the deflection of the test element with the magnitude of the laser-generated shock wave or correlating the deflection of the test element with a material property of a workpiece, such as imparted residual stress, fatigue life, or fatigue strength. Correlation of the test element with shock wave and fatigue or other material properties is accomplished through separate measurements of shock-waves, material effects, or fatigue properties using substantially identical laser pulses. In most cases, it is necessary to use many laser pulses, applied to the workpiece in an overlapping pattern, to create the desired material or fatigue-property effect in the workpiece. For example, after laser shock peening the fatigue-critical area of a workpiece with overlapping spots of a selected laser pulse, the workpiece may be fatigue tested to determine the fatigue life of the workpiece. The measured fatigue life can then be correlated to a specific deflection of a test element using a substantially identical laser pulse. In this way, a single laser pulse can be used on a test element as part of a quality assurance procedure to ensure that the laser peening system will produce workpieces with the desired fatigue-life properties. According to the invention, the data set generating step is repeated until a sufficient number of test element dimensions, laser pulse metrics, and corresponding deflections are recorded and correlated to the desired properties of the workpieces, or more generically, to a desired residual stress profile within a selected material.

In a still further embodiment of the present invention, a method of selecting a test element for use in measuring the magnitude of a shock wave resulting from a single laser pulse comprises the steps of determining the properties of the laser system to be used; selecting the second overlay thickness; selecting the duration of the laser pulse; selecting the maximum amount of test element deflection desired; selecting the laser pulse impact position on the test element; and calculating the permissible composition and ranges of dimensions for the test element from the above values.

In yet another embodiment of the present invention, a method is disclosed of ensuring the proper operation of a laser shock peening system for a production laser-peening process comprising; laser peening a test element using a single laser pulse; measuring the deflection of said test element caused by said laser peening; determining if said deflection is within a predetermined range; and then laser peening production work pieces.

It is an advantage of the present invention that impulse monitoring can be accomplished with only a single laser pulse to a test element. Where previously, multiple laser pulses were required in the form of a pattern to generate sufficient in-plane deflection in a test element, the present invention allows for more efficient testing without compromising accuracy.

It is a further advantage of the present invention that quality control monitoring can be accomplished much more quickly and efficiently with the simple measurement of the deflection of the test element, and the subsequent comparison of that deflection to a pre-generated chart or data set.

In yet another embodiment of the present invention, a single test element is mounted in a fixture and secured in the anticipated path of two substantially-symmetrically opposed laser beams. The two substantially-symmetrically opposed laser beams, directed toward each other, are fired at substantially the same time wherein they may have substantially identical processing conditions and arrive at the processing plane at substantially the same time. The second overlay is applied to both sides of the gauge and the thickness of this overlay may or may not be the same thickness on both sides. In this case, the gauge will be used to ensure substantially similar processing conditions are produced for each surface of a two-sided laser peening operation. A measurable deflection in the gauge will indicate potentially non-symmetric processing conditions between the two laser beams or a potentially significant difference in the arrival time of the two laser beams on the target plane. For symmetric processing, substantially zero deflection on the gauge is desirable.

In some part-specific configurations, it may be desirable to produce a non-symmetric processing condition. If non-symmetric processing is desirable, the above-described method may be used, except that a measurable deflection is expected.

It is another advantage of the present invention that the shape, dimensions, and composition of a test element can be varied to accommodate a variety of materials, or varied applications.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 9 is a graph showing the relationship between peak pressure generated by a laser pulse on the test element and deflection of the test element of FIG. 2, for a variety of preselected test element thicknesses, given a laser pulse width of 12 ns;

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
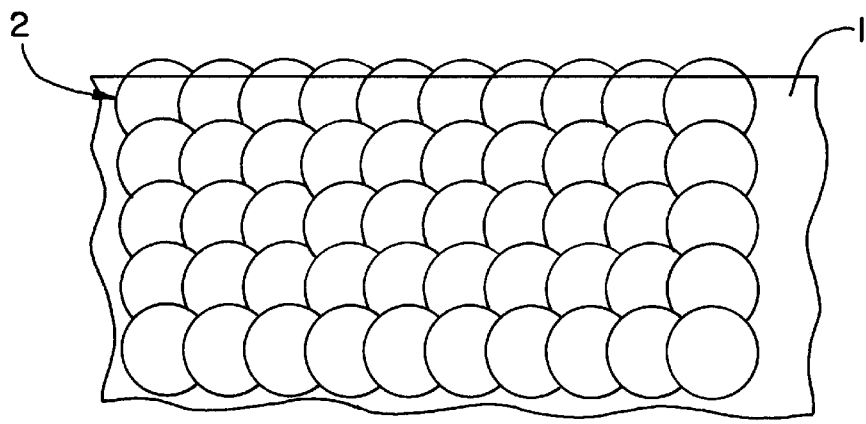
FIG. 1 is a prior art device for testing the quality of a laser pulse for effective laser shock peening.

Referring now to the drawings and particularly to FIG. 1, a prior art test element typically comprises a test element 1 for positioning in the anticipated path of a laser pulse, the laser pulse impacting the test element a plurality of times in an overlayed matrix 2 or non-overlayed matrix in order to enable sufficient deflection measurement. Subsequent to the plurality of impacts, a measurement is typically taken of the in-plane deflection of the test element, which is affected by the magnitude and quantity of the laser pulse impacts. This process requires extensive time for setting up and applying the pattern of laser shots (pulses), and the amount of in-plane deflection generated by this technique is relatively small, requiring an instrument to measure small deflections while attempting to create a high degree of precision. Further, this type of test involves an average response to an average value of the plurality of laser shots.

Another method of measuring the quality of laser shock processing is to perform high cycle fatigue testing of laser shock peened components, however, this method is also disadvantageous because it is time consuming, costly, and is not acceptable for continuous production because it may require terminating the production processing while the fatigue test results are acquired.

Figure 2A:
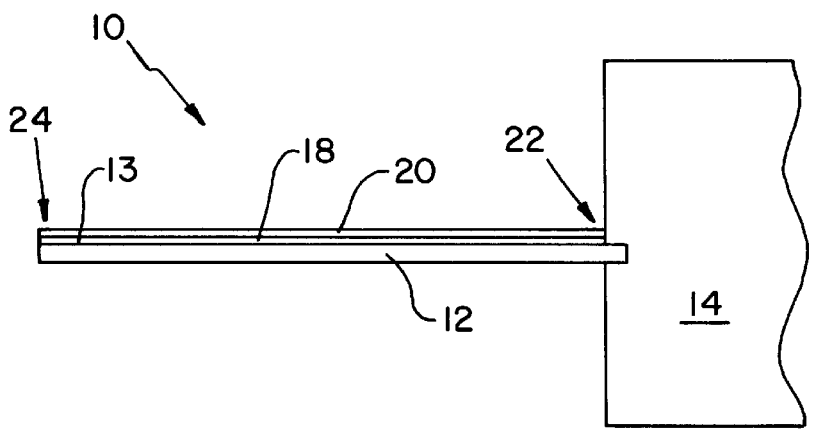
FIG. 2 is a diagrammatic view of one embodiment of the present invention incorporating a strip-shaped test element.
Figure 2B:
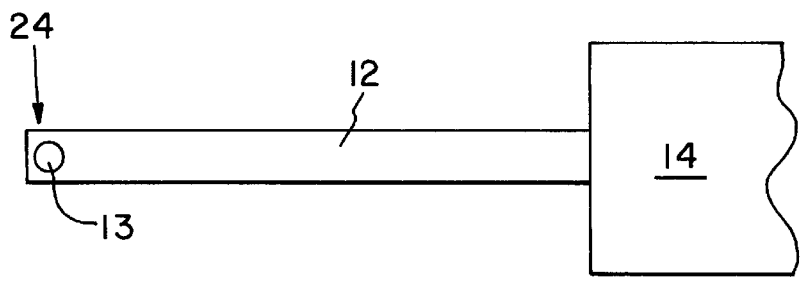

As shown in FIG. 2, the present invention relates to a gauge 10 for measuring the magnitude of a shock wave resulting from a single laser pulse, the gauge 10 comprising a test element 12 (also referred to as a "coupon"), and a mounting means 14 for mounting the test element such that a portion of the test element 12 is in the anticipated path of the laser pulse. The deflection resulting from the shock wave is thereafter measured in the direction substantially perpendicular to and away from the impacted surface, and the deflection measurement is indicative of the magnitude of the impulse imparted by the laser pulse.

According to the invention, the test element 12 can be formed in the shape of a strip or a sheet, however, any shape capable of offering a measurable deflection upon being impacted with a laser pulse is within the scope of the invention. In the preferred embodiment of the invention, the test element 12 is preferably coated with a first overlay 18 and a second overlay 20, the first overlay 18 preferably being an opaque coating such as a paint or a tape, and the second overlay 20 preferably being a transparent layer, typically water, although other materials are known and may be used. It should be understood that the thickness of the second overlay 20 has a significant effect on the amount of deflection in test element 12 when all other process conditions are held constant. The thicker the second overlay 20, the greater the amount of deflection in test element 12. Typically, the transparent overlay thickness can range from 0.2 to 5.0 millimeters thick. The thickness and uniformity of the second overlay may be controlled to minimize variability in the measured deflection of the test element.

In the preferred embodiment, test element 12 has a selectable thickness between 0.7 and 2.5 millimeters. However, it should be understood that the dimensions of the test element are greatly variable, and other thicknesses, radiuses, lengths, or widths are all within the scope of the invention. It is only necessary that during the testing procedure, the test element provides a measurable deflection under the impact of the single laser pulse.

As shown in FIG. 2, mounting means 14 preferably comprises a device such as a vice, where test element 12 in the form of a strip is held. The mounting means 14 secures a first end 22 of test element 12 such that second end 24 of test element 12 is held in the anticipated path of the laser pulse.

Figure 3A:
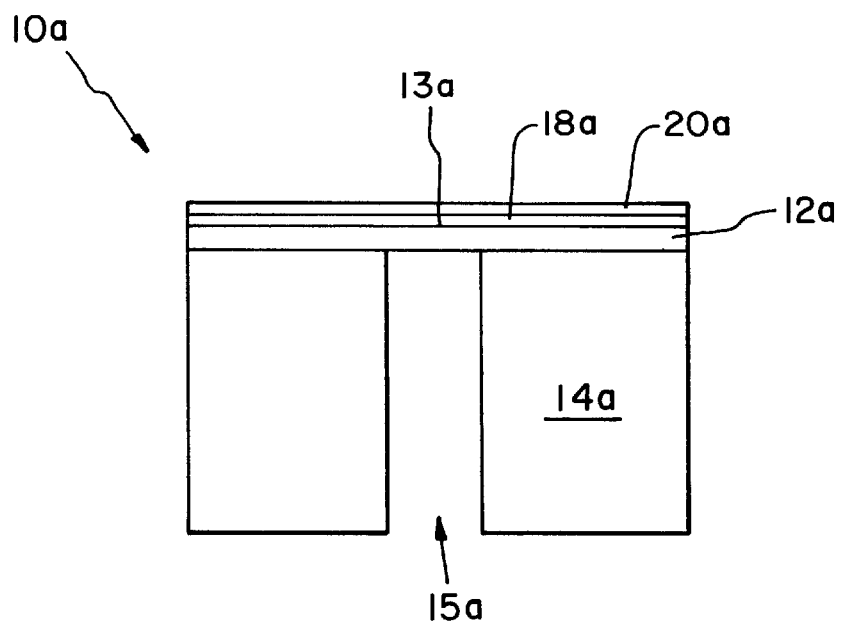
FIG. 3 is a diagrammatic view of another embodiment of the present invention incorporating a sheet-shaped test element.
Figure 3B:
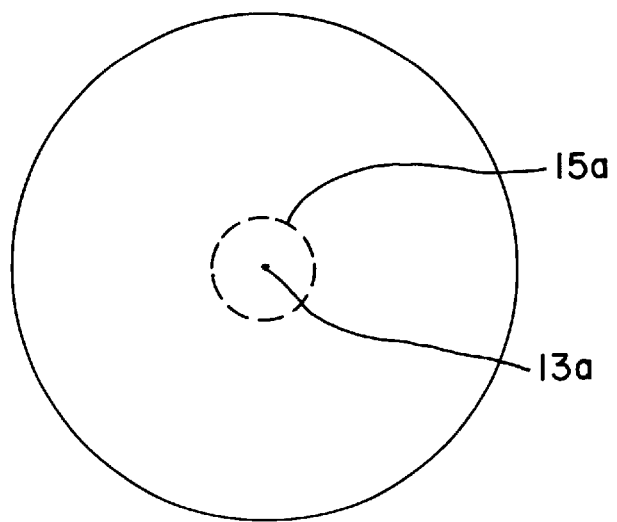

Another embodiment of the invention is shown in FIG. 3, wherein mounting means 14a preferably comprises a base, and test element 12a is in the form of a sheet, and in the form shown a disk. In this embodiment, mounting means 14a defines an recess 15a, and is positioned to avoid the anticipated path of a laser pulse in such a way that recess 15a is in the anticipated path of the laser pulse, thereby allowing mounting means 14a to support a sheet test-element 12a without being subjected to a laser pulse. In the preferred embodiment, recess 15a can be a round hole or aperture have a diameter between 12 and 25 millimeters, however, it should be understood that variations in the thickness of the sheet will allow significant variations in the diameter of the aperture, and therefore all are within the scope of the invention. Similarly, the recess does not need to be round or extend through the base mounting plate. The recess could be any convenient shape that will allow the test element to deform into or about the recess without interference, and therefore all recess shapes are within the scope of the invention.

According to the invention, the test element 12 is preferably comprised of a metallic material such as 6061-T6 aluminum alloy, steel, or any other suitable alloy or material that will maintain a permanent offset after the test is finished.

Upon irradiating the test element with the laser pulse, a plasma plume is ignited on the face 13, 13a of the test element 12, 12a. As a result, deflection of test element 12 occurs substantially perpendicular to the face 13, 13a of the test element 12, 12a and away from the face 13, 13a. This deflection can be measured by measuring means 16, which can comprise any one of several known methods in the art for measuring deflection.

Figure 4:
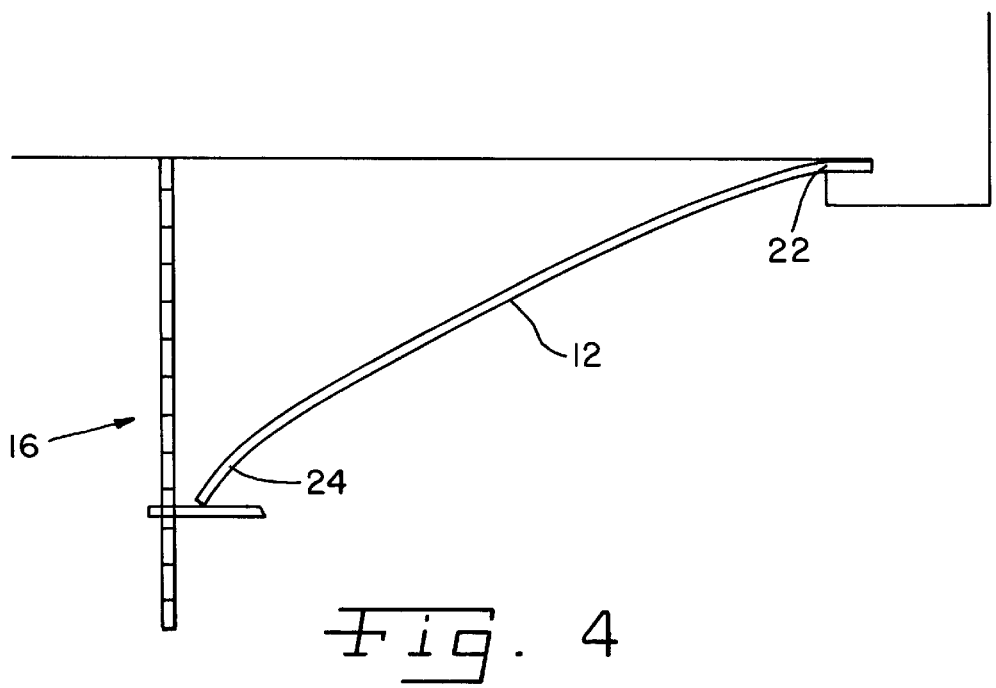
FIG. 4 is a diagrammatic side view of a measuring means for determining the deflection of the strip-shaped test element of the present invention.

FIG. 4 shows the strip test element 12 of an embodiment supported at its first end 22 while measuring means 16 determines the distance that the second end 24 of test element 12 is displaced. Alternately, measuring means 16 can be used to measure the depth, area, volume or other measurable changes of the deflection of the sheet embodiment of test element 12a by measuring the distance between a point of deflection and the originating position. Measuring means 16 may be secured to the mounting means 14, 14a, or may be located remote from the mounting means 14, 14a. Measuring means 16 may provide either manual or automatic means of measuring the deflection.

Measuring means 16 as shown in FIG. 4, may be that of a ruler or other measuring device to determine the distance of the deflection of test element 12. An automatic type may be that of XL2-13 laser through beam photo electric sensor (wide beam type) made by the Keyence Corporation of America of Woodcliff Lake, N.J., although other deflection detection and measurement devices may be alternatively utilized.

According to the invention, gauge 10 operates substantially as follows. A test element 12, 12a, such as that shown in FIG. 2 or 3, is mounted and secured in the anticipated path of a laser pulse. Preferably, the laser beam will be oriented such that face 13, 13a is substantially perpendicular or normal to the laser beam, however, the invention will still be effective with the laser beam oriented at an angle to face 13, 13a. Test element 12, 12a is then coated with a first overlay 18, 18a, preferably comprised of an opaque paint or tape. Alternatively, first overlay may be applied at the time of manufacture of test element 12. Thereafter, in the preferred method, second overlay 20, 20a is applied, typically a transparent layer such as water wherein the thickness of the water is controlled in such a manner as to achieve the same thickness and uniformity as in previous tests. A laser pulse is then energized, and a single laser pulse of a preselected duration is directed toward test element 12, 12a. The laser pulse ignites a plasma plume on the face 13, 13a of the test element 12, 12a, creating a shock wave that deflects element 12, 12a. Upon the deflection of element 12, measuring means 16 (shown in FIG. 4) is utilized to detect the deflection of second end 24 of test element 12. Alternately, in the sheet test element embodiment of FIG. 3, measuring means 16 is used to measure the depth of the deflection of test element 12a by measuring the distance between a point of deflection and the originating position of the element 12a. In one form of the invention, the greatest magnitude of deflection is measured.

Upon measurement of the deflection, comparison is made to previously generated data to determine the quality of the laser pulse for effective laser peening. By comparing deflection measurements to data derived from the same thickness of test element, the same material composition, and the same laser-pulse characteristics, determination can be made of the effectiveness of the laser peening process for processing production, or other, workpieces. This determination provides an indication of the quality of the laser beam, allowing a laser operator to assess whether design criteria and appropriate conditions are being met in the workpiece.

Figure 5:
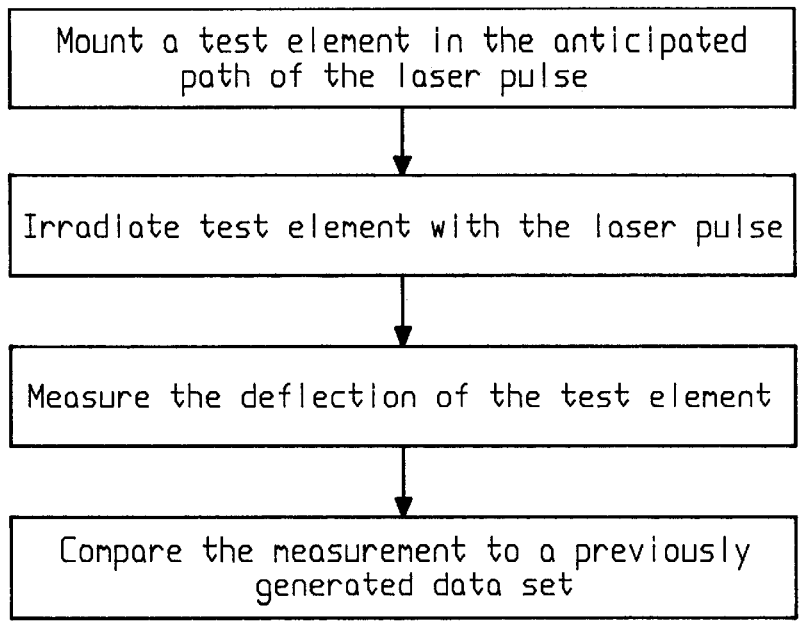
FIG. 5 is a flow chart depicting yet another embodiment of the present invention.

In another embodiment of the invention, as shown in FIG. 5, a method of measuring the effectiveness of a laser peening process by measuring the deflection of a test coupon (element) from a single laser pulse comprises the steps of: mounting a test element in the anticipated path of the laser pulse; irradiating the test element with the laser pulse; measuring the deflection of the test element in the direction substantially perpendicular to and away from the impacted surface 13, 13a; and comparing the deflection measurement to a previously generated chart or data set, the previously generated chart depicting the relationship between test element dimensions, test element composition, laser pulse metrics, second overlay thickness, residual stress within the workpiece, fatigue or other material properties, deflection measurement, and shock wave magnitude.

Figure 6:
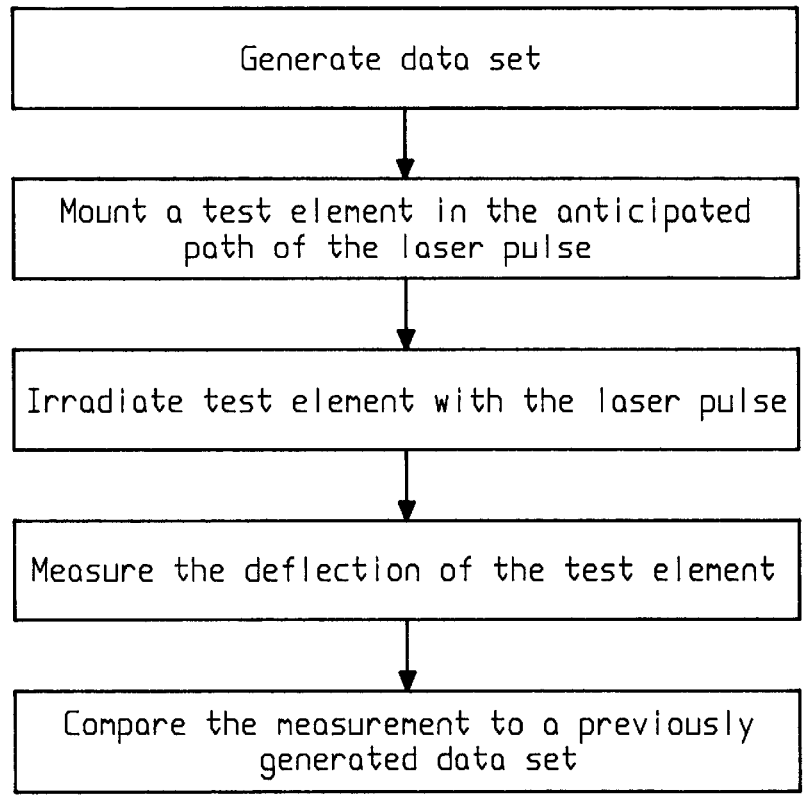
FIG. 6 is a flow chart of still another embodiment of the present invention.
Figure 8:
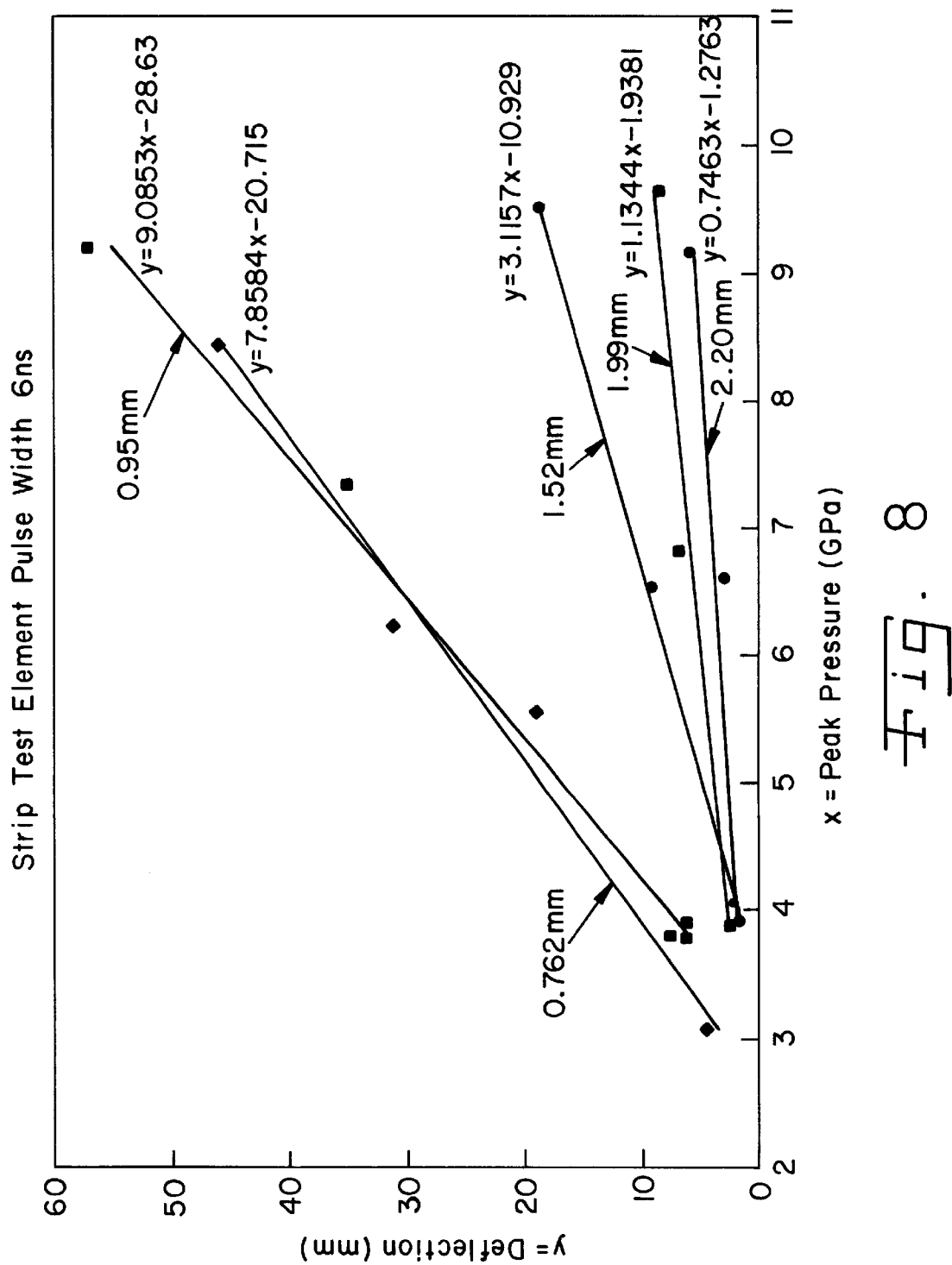
FIG. 8 is a graph showing the relationship between peak pressure generated by a laser pulse on the test element and deflection of the test element of FIG. 2, for a variety of preselected test-element thicknesses, given a laser pulse width of 6 ns.
Figure 6:
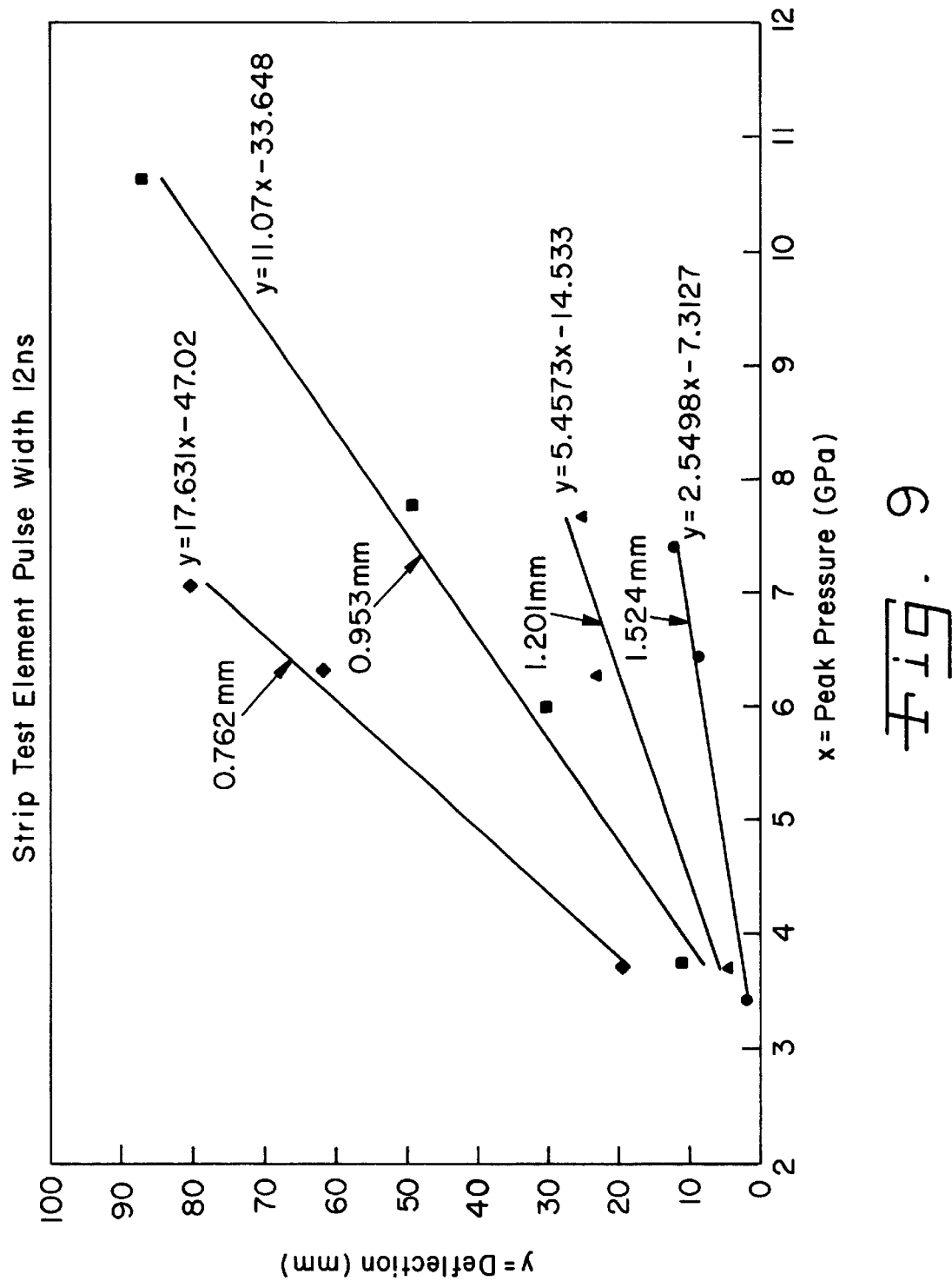
Figure 10:
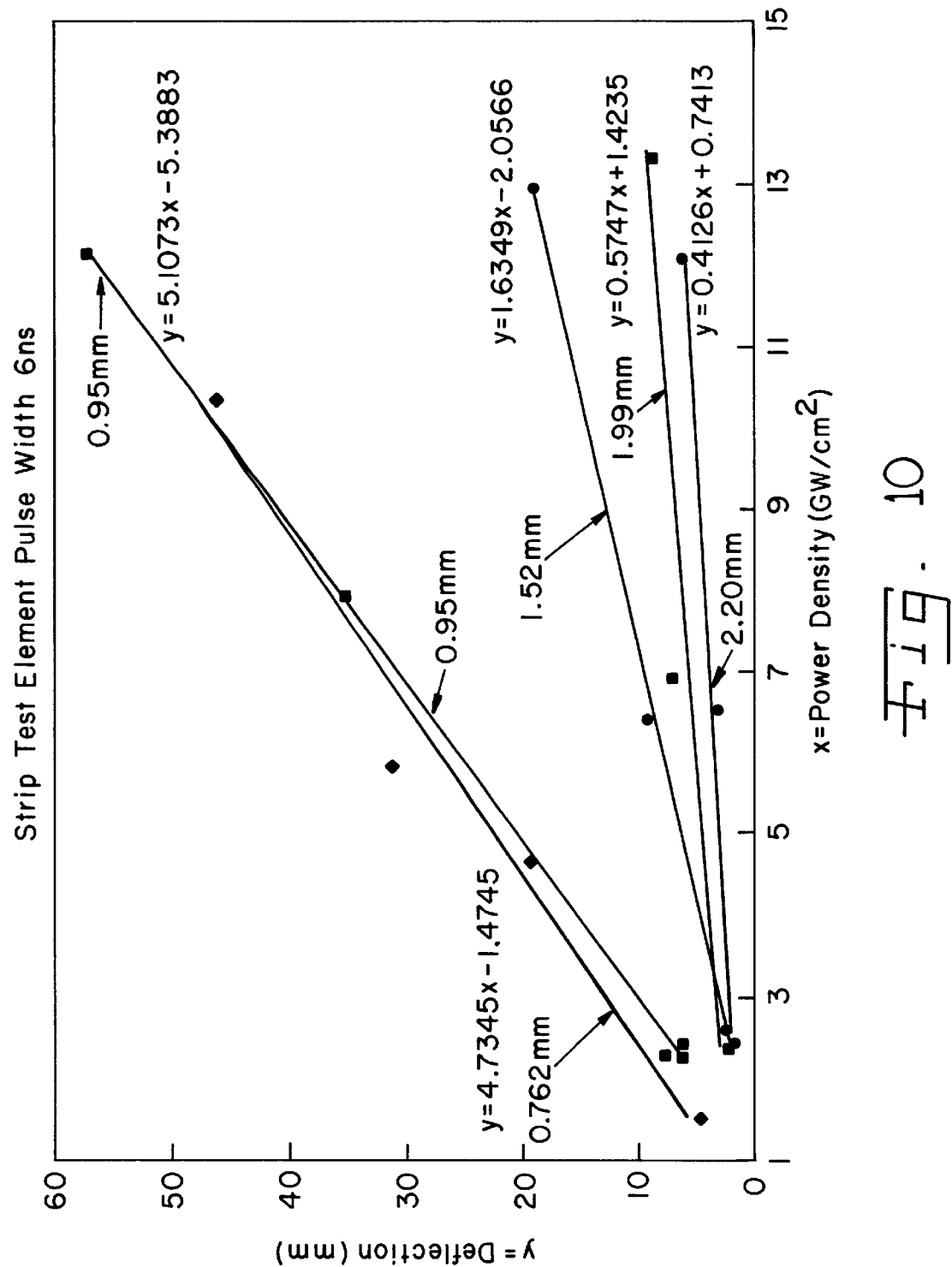
FIG. 10 is a graph showing the relationship between the power density of a laser pulse on the test element and deflection of the test element of FIG. 2, for a variety of preselected test element thicknesses, given a laser pulse width of 6 ns.
Figure 11:
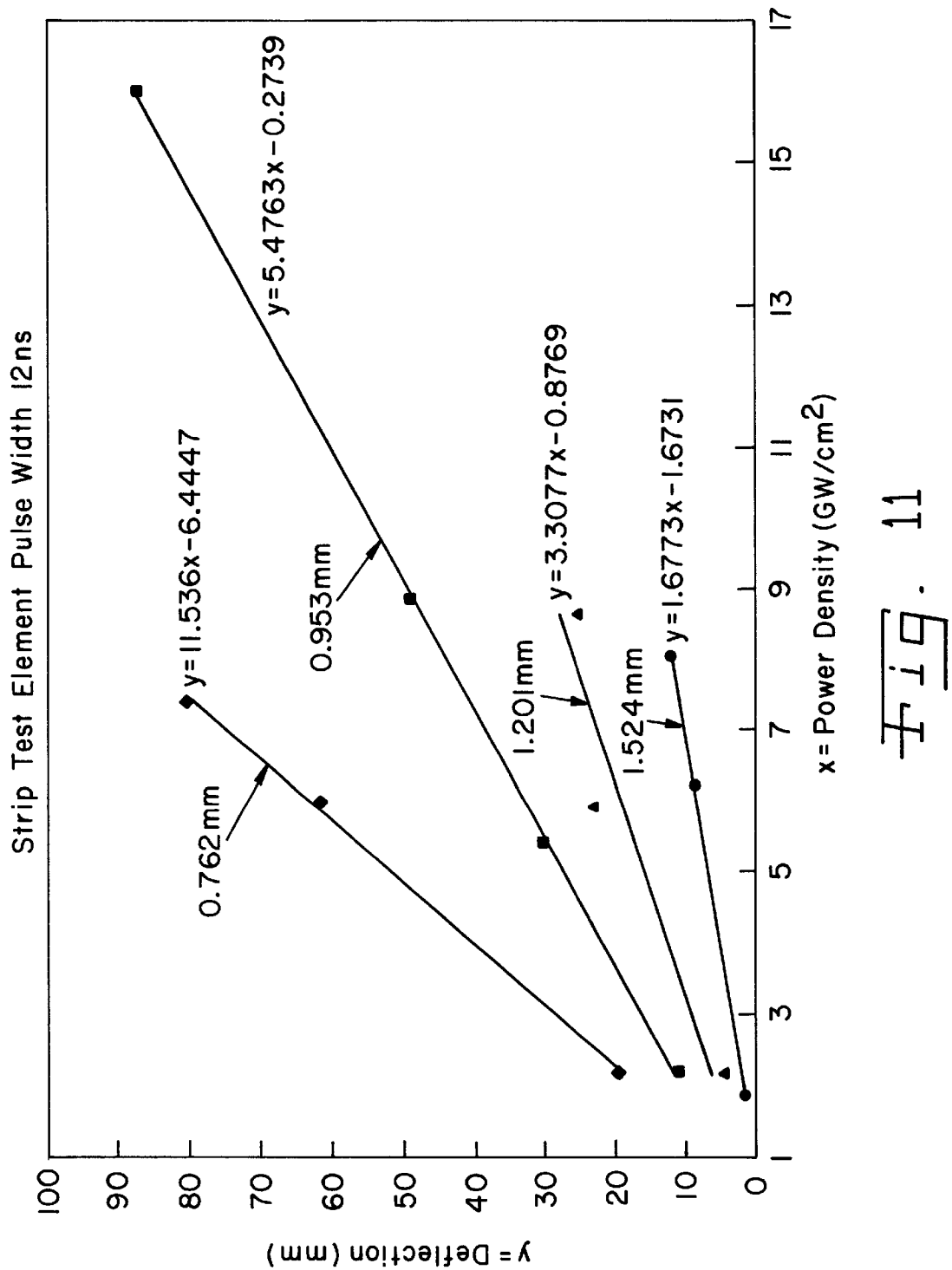
FIG. 11 is a graph showing the relationship between the power density of a laser pulse on the test element and deflection of the test element of FIG. 2, for a variety of preselected test element thicknesses, given a laser pulse width of 12 ns.

As shown in FIG. 6, the present invention, in yet another embodiment thereof, comprises the steps of: generating a data set; mounting the test element in the anticipated path of a laser pulse irradiating the test element with the laser pulse; measuring the deflection of the test element in the direction substantially perpendicular to and away from the impacted surface 13, 13a and comparing the deflection measurement to the data set. According to this embodiment of the invention, the data set generating step includes the steps of selecting a test element with desired dimensions and material composition; mounting the test element in the anticipated path of the laser pulse; selecting a laser pulse having the desired laser-pulse metrics (e.g. energy, pulse width, pulse rise time, spatial profile, etc.); and, second overlay thickness 20, 20a to produce the desired workpiece property (e.g. residual stress, surface hardness, fatigue life, fatigue strength, resistance to fretting fatigue, wear, and stress corrosion cracking, etc.); irradiating the selected test element with the selected laser pulse; measuring the deflection of the test element; and confirming that the deflection is within a preselected range to create the desired workpiece property.

Results of preliminary data generation are shown in FIGS. 8 through 13. In deriving the data, a plurality of test elements 12 of selected thicknesses were placed in mounting means 14, and a plurality of selected laser pulses having known laser beam metrics were directed at the second end 24 of each test element 12. The laser pulse impacted a selected point on face 13 of test element 12 that was 4 millimeters from the tip of second end 24. Further, each test element 12 was 6 millimeters wide by 100 millimeters long, and 6 millimeters were gripped by the mounting means 14. The deflection observed by second end 24 was then measured by measuring means 16, and the results recorded.

Figure 7:
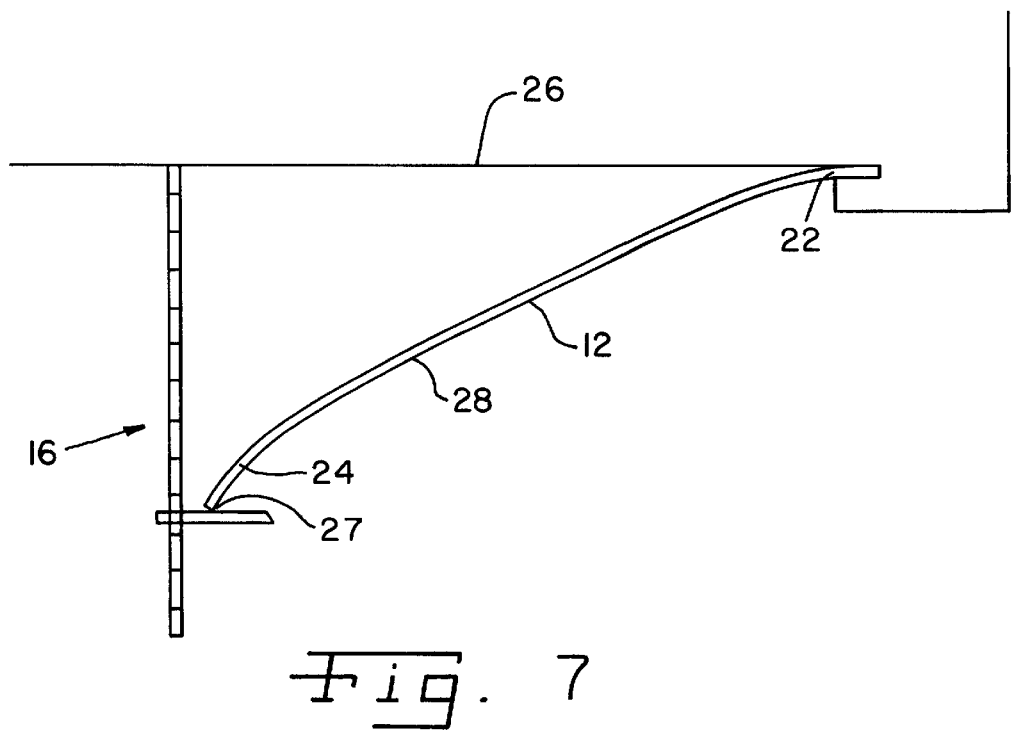
FIG. 7 is diagrammatic view showing the method of measuring the test elements with the measuring means.

Measuring was accomplished utilizing equipment substantially as shown in FIG. 7. Test element 12 was held at its first end 22 so that its front surface 30 was flush or parallel with a flat surface 26, and measuring means 16 indicated the distance between the flat surface 26 and the tip 27 of the test element 12. The tip was defined as the highest point on the back surface 28 of the deflected gauge. While this measurement of the deflection included in its calculation the thickness of the test element 12, and therefore plotted charts were likely affected by this additional thickness, it is within the scope of the invention to subsequently subtract that thickness from the deflection measurement, or to calculate the deflection in other manners.

After measurement of the deflection of the test element 12, a chart was plotted of the relationship between applied laser power density recorded for the actual single laser pulse used for each test and the corresponding deflection. Similarly, a chart was plotted of the relationship between peak pressure as measured with quartz gauges using substantially identical laser pulses in separate test and the corresponding deflection. As can be seen in FIGS. 8 through 13, a substantially linear relationship exists. The only deviations from the substantially linear relationship were observed when the deflection of the test element 12 exceeded a 65-degree angle from the originating plane. It is suggested that in circumstances where the dimensions of the test element 12 are too small relative to the peak pressure of the shock wave, such that the test element exceeds a 65-degree deflection from the originating plane, the results become unreliable.

Each test element thickness has a specific substantially linear relationship between peak pressure and deflection as seen in FIGS. 8 through 13. With increasing strip gauge thickness, the slope of the line decreases, indicating the thicker gauges were not as sensitive to changes in peak pressures as were the thinner gauges. Based upon these results, the peak pressure generated by any laser pulse can be determined by measuring the deflection, and then comparing that measurement with the chart associated with the appropriate pulse width and test element thickness. Equations for the linear relationships are shown on each graph. Furthermore, a model can be developed to predict the relationship between peak pressure and deflection for strip gauge thicknesses that aren't tested.

It should be understood that although the testing outlined above only varied the thickness of the test element, other dimensional and geometrical variations are possible and will similarly affect the deflection in a linear relationship. For instance, while it is apparent from testing that greater thicknesses result in smaller deflections when all other variables remain equal, it follows that linear relationships exist between the deflection and variations in the length and width of the test element, as well.

It is known from the above testing that the measurable deflection of a test element is a function of laser pulse metrics, magnitude of the shock wave, dimensions of the malleable portion of the test element, material composition, and point of laser pulse impact. By generating a data set correlating the laser pulse metrics to specific workpiece properties, such as fatigue life or fatigue strength, the test elements can be used as a quality control and quality assurance test during production processing of the workpieces.

Figure 12:
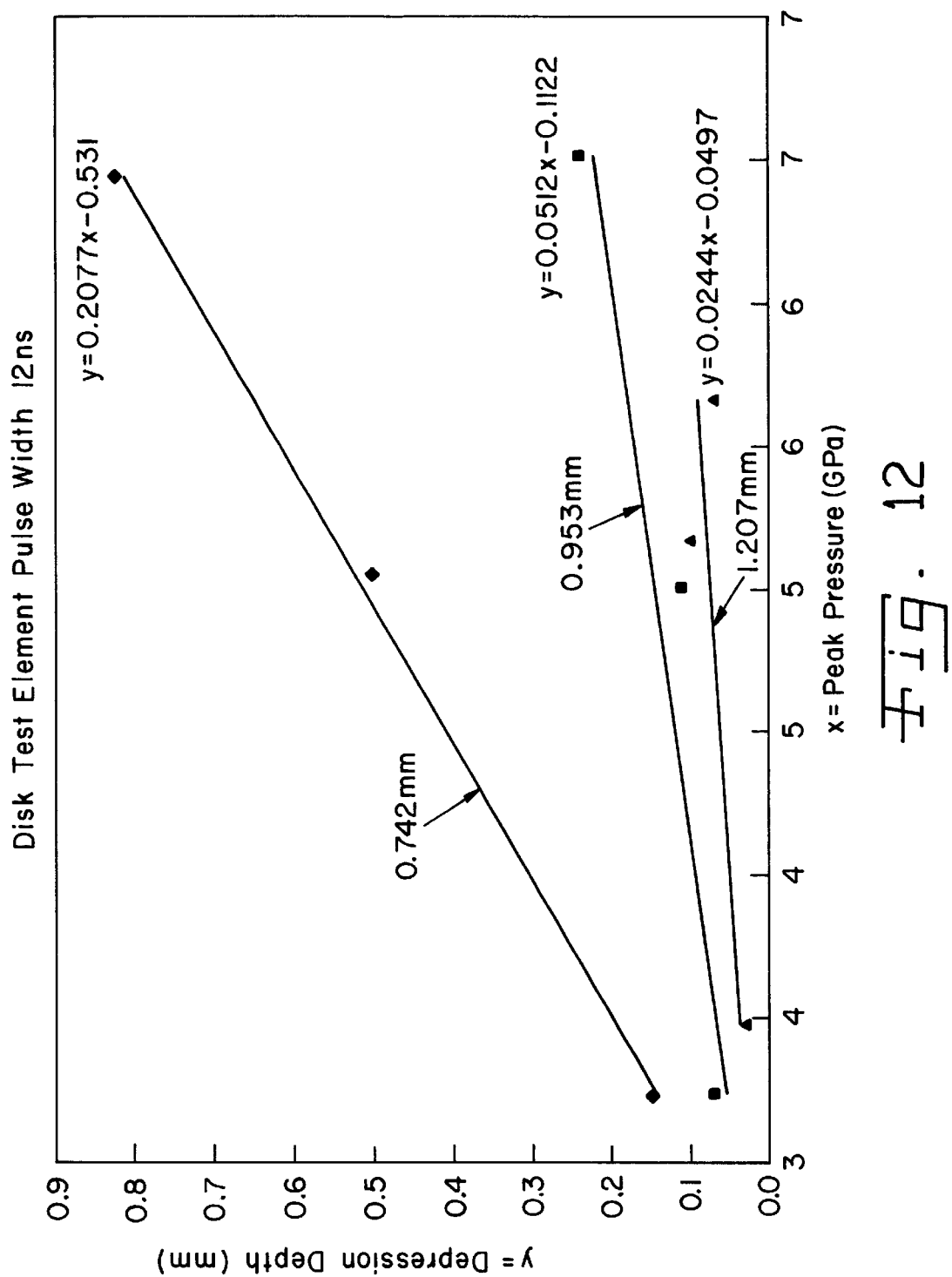
FIG. 12 is a graph showing the relationship between peak pressure generated by a laser pulse on the test element and deflection of the test element of FIG. 3, for a variety of preselected test element thicknesses, given a laser pulse width of 12 ns.
Figure 13:
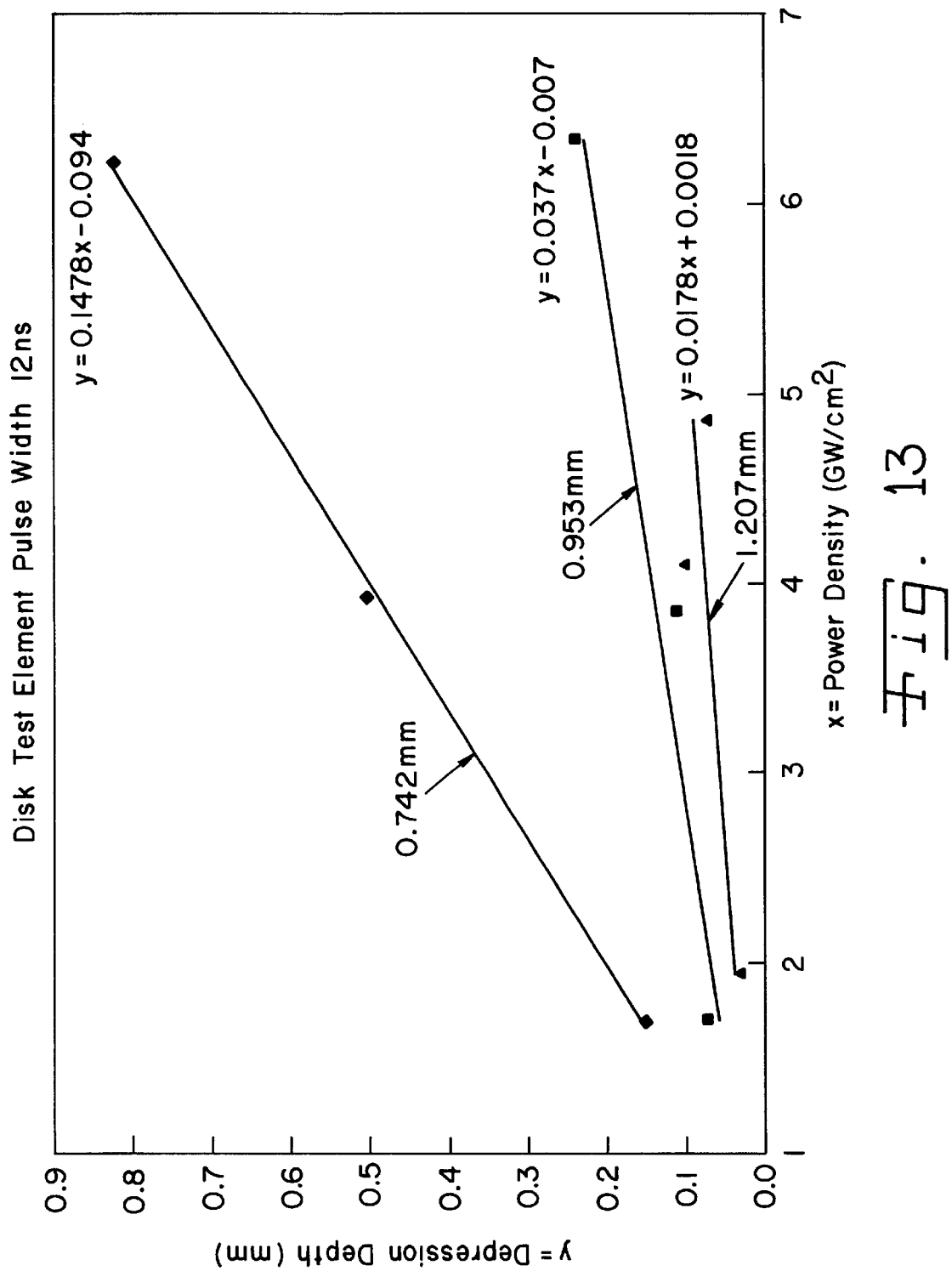
FIG. 13 is a graph showing the relationship between the power density of a laser pulse on the test element and deflection of the test element of FIG. 3, for a variety of preselected test element thicknesses, given a laser pulse duration width of 12 ns.

FIGS. 8 through 11 show charts relating to the strip embodiment of test elements. However, it is important to note that FIGS. 12 and 13 show results from the testing of a sheet embodiment of test element 12a.

In yet another embodiment of the present invention, a test element can be selected for use in assessing the quality of a laser peening process when the laser metrics and second overlay thickness 20, 20a are selected, the maximum test element deflection (i.e. the sensitivity) is selected, and the laser pulse impact position is selected. From these values, a range of permissible compositions and dimensions can be determined, thereby allowing an operator to choose, for example, what length and width values would best correspond to the thickness of material that the operator has in stock, or to the relative mounting means. The chosen test element can then be used to verify that the desired laser peening effects are being generated within the workpiece.

In still another embodiment of the present invention, a test element is used to ensure the proper operation of the laser-peening system for production laser peening, the test element is laser peened with a single pulse from the laser, the deflection caused by the laser peening the test element is measured, determining if the deflection is within the predetermined range, and then laser peening production workpieces.

Figure 14:
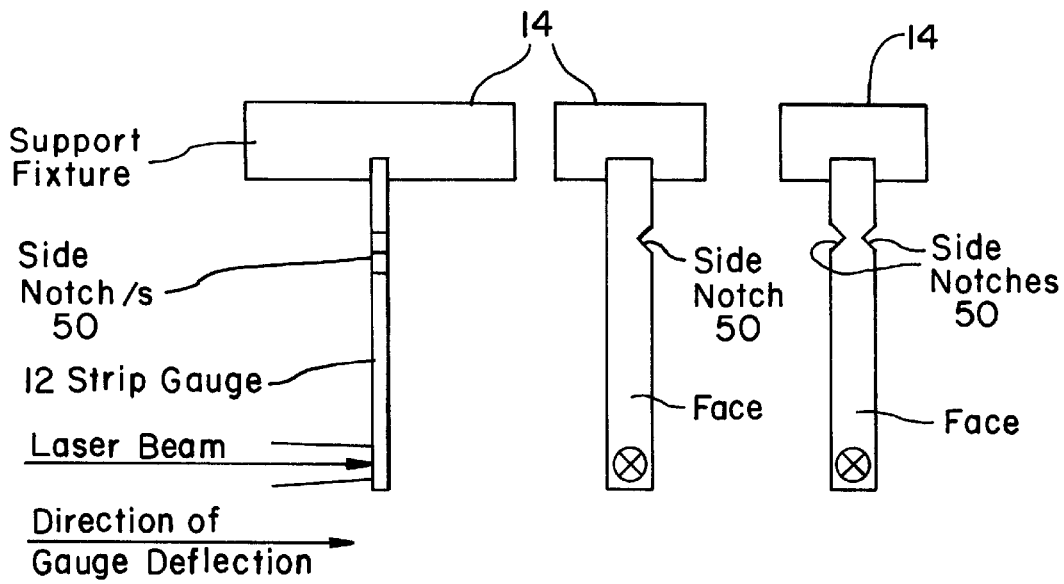
FIG. 14 is a diagrammatic view of another embodiment of the present invention incorporating a single and double side-notched strip-shaped test element.

As related above, different geometries of the test members may be used either to enhance or degrade deflection potential during use of the system. As shown in FIG. 14, a strip test element 12 is located in a support fixture 14. As shown in FIG. 14, test element 12 includes a side notch 50, in which notch is cut into test element 12 perpendicular to the direction of the beam path and test element 12 deflection during use. Via the use of side notch 50, the particular bending potential engaged deflection for particular type of test element 12 may be controlled. By varying the shape of side notch 50, particular corresponding changes may be made in test element 12 sensitivity. Further shown in FIG. 14, more than one side notch 50 may be utilized on test element 12. In one embodiment, more than one side notch may be utilized either on opposite sides or on the same side to control test element 12 sensitivity to deflection.

Figure 15:
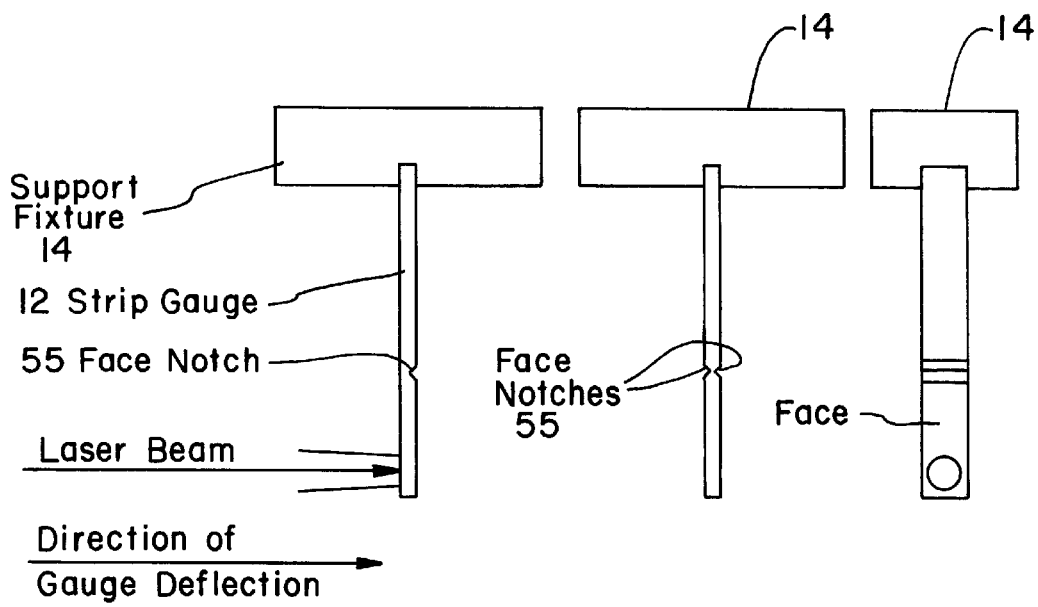
FIG. 15 is a diagrammatic view of another embodiment of the present invention incorporating a single and double face-notched strip-shaped test element.

In another embodiment, having a change in deflection potential or a structural change or weak point in test element 12 is shown in FIG. 15. In this embodiment, test element 12 includes a face centered notch 55 lying on one or the other face surface of test element 12. Face centered notches 55 may include one or more notches on the same or opposite faces either in alignment above and below each other relative to the faces, or offset a particular distance. By controlling the particular depth and radius of face notches 55, the deflection potential and ability of test element 12 may be controlled or enhanced.

While FIGS. 14 and 15 display utilization of a test element 12 in a single sided laser shock processing operation, double side processing may be also utilized.

Figure 16:
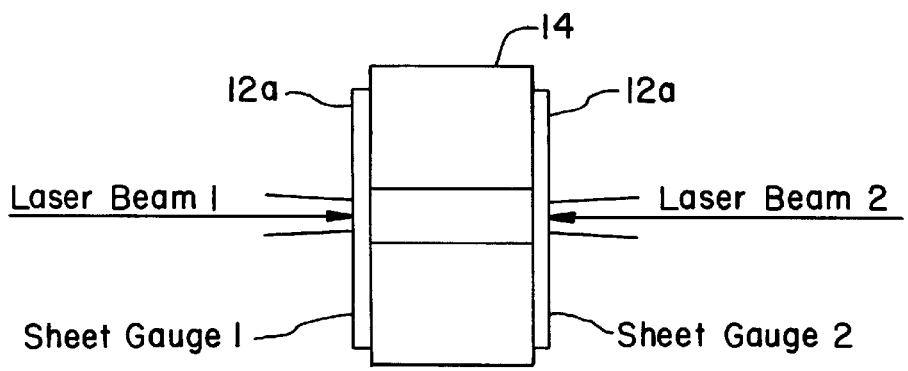
FIG. 16 is a diagrammatic side view of another embodiment of the present invention incorporating two sheet-shaped test elements for symmetric double-sided laser shock peening applications.

The embodiment disclosed in FIG. 16 shows a symmetric orientation of the test elements 12a located about a support fixture 14, about a bore 15a. With the mounting system as shown in FIG. 16, double sided processing, i.e., utilization of two laser beams directed toward each other may be utilized. In this case, for the laser peening operation of the deflection of test element 12a may be compared each to previously designed data sets, and additionally compared to each other to insure similar processes and conditions are created with each of the left hand and right hand beams, as shown in FIG. 16.

Figure 17A:
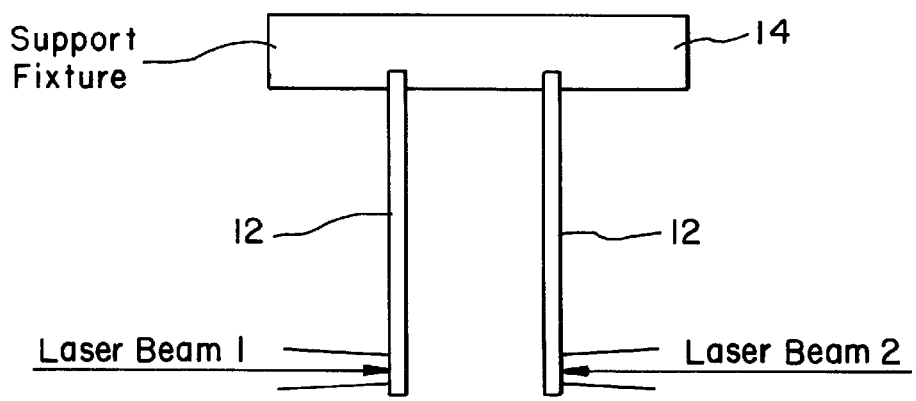
FIG. 17 is a diagrammatic view of another embodiment of the present invention incorporating two strip-shaped test elements for asymmetric double-sided laser shock peening applications.
Figure 17B:
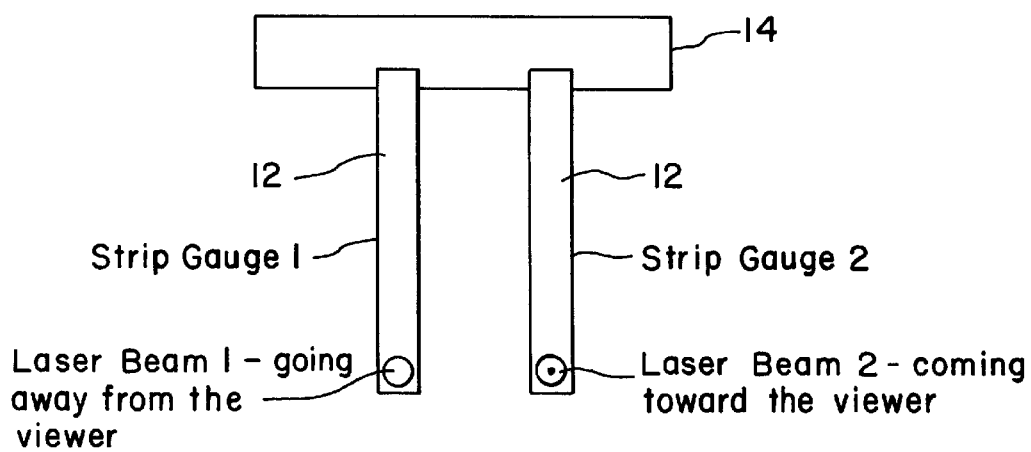

Asymmetric double side processing is shown in FIG. 17, in which two test elements 12 are supported within support fixture 14, and processed by incoming beams from the left and right hand side. As shown in FIG. 17, depending upon whether laser beam and created plasma plume is applied to one side or another of test element 12, a different spot may be visually perceived on test element 12. All of the previous strip type test elements 12 have been sized to where the laser spot is substantially the same diameter as the width of the test element.

Figure 18:
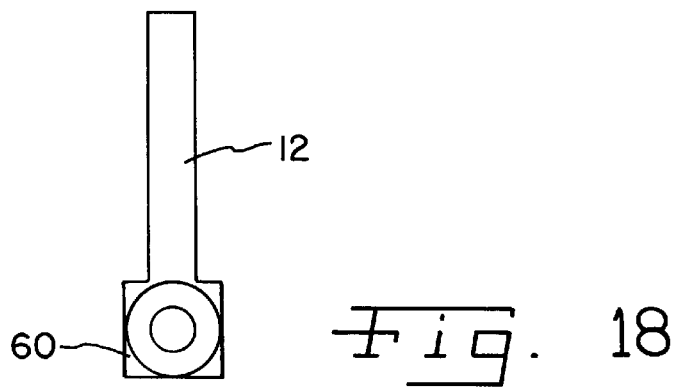
FIG. 18 is a diagrammatic view of another embodiment of the present invention incorporating a strip-shaped test element with a larger target processing pad for variable spot size laser shock peening applications.

FIG. 18, shows a front view of a alternate strip test element 12b, in which a target 60 is located on one end of test element 12b. By sizing target area 12 appropriately, a single styled test strip 12b may be utilized for and with different laser spot sizes. As shown in FIG. 18, a square target area 60, having a width of the elongated portion of test strip 12b is utilized. Test area 60 may comprise any particular size, to enable use with different size laser spots, particularly those laser spots whose diameter is greater than the width of test strip 12b.

Figure 19A:
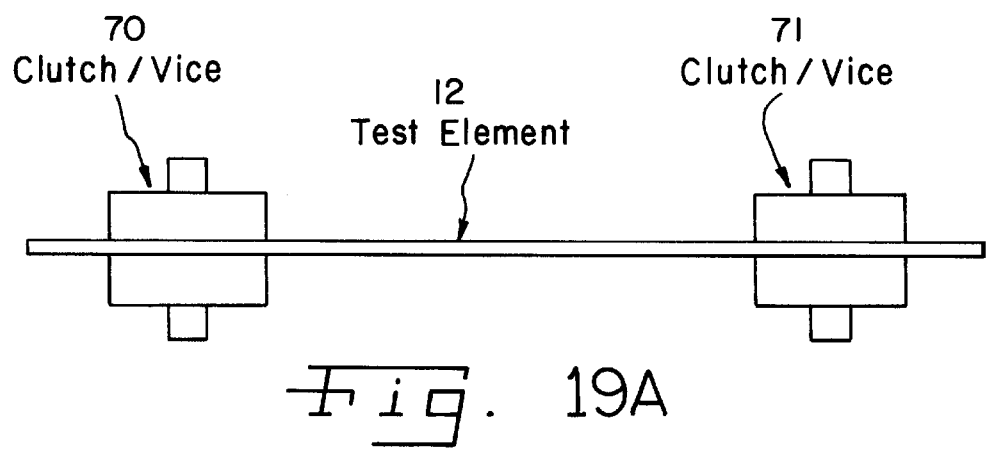
FIG. 19 is a diagrammatic view of another embodiment of the present invention incorporating a strip-shaped test element within a base such that both ends of the strip-shaped test element are supported.
Figure 19B:
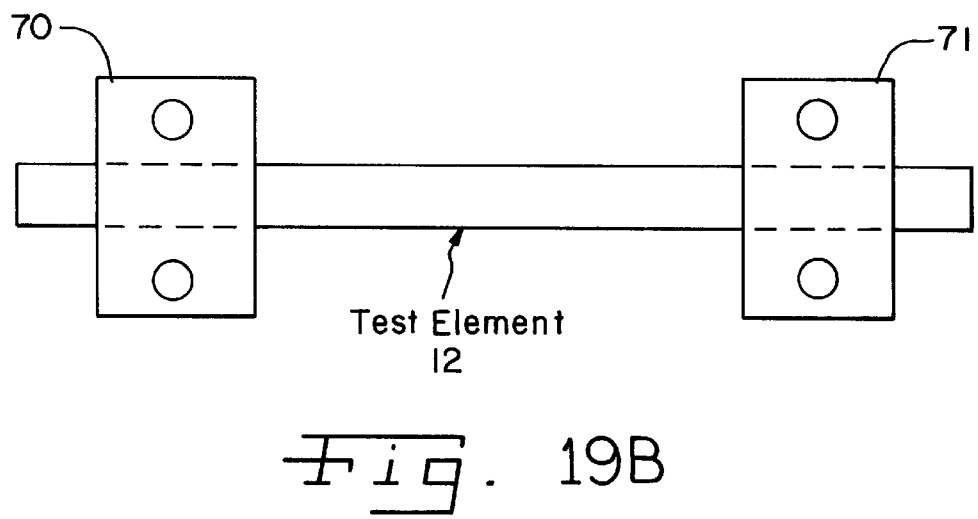
Figure 20A:
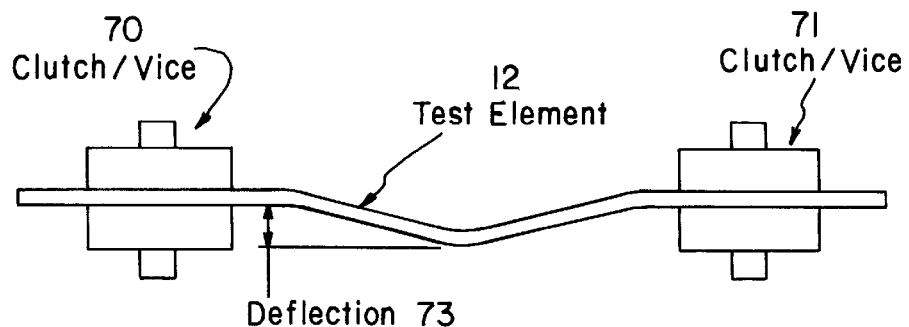
FIG. 20 is a diagrammatic view of the embodiment of FIG. 19 illustrating the deflection of the test element after laser peening with a single laser pulse.
Figure 20B:
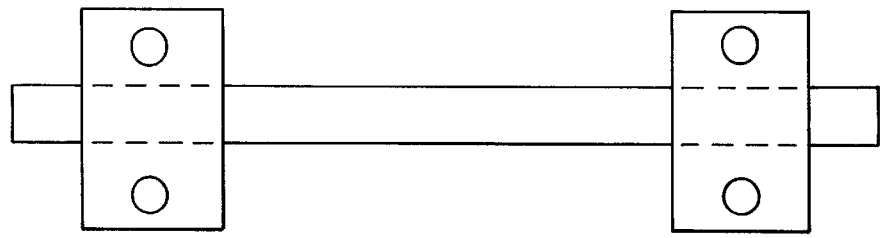

In another embodiment of the present invention as shown in FIG. 19 a test element 12 is fixed at two ends 70, 71. The center of the test element is unsupported and is placed in the anticipated path of the laser pulse. The deflection 73 resulting from the shock wave as shown in FIG. 20 is thereafter measured in the direction substantially perpendicular to and away from the impacted surface, and the deflection measurement is indicative of the magnitude of the impulse imparted by the laser pulse. In another embodiment, one of the fixed ends 70 supporting the test element 12 allows the test element 12 to slide through the support with minimal friction during the test, thus allowing potentially greater deflection 73 in the test element 12.

Figures 22A, 22B:
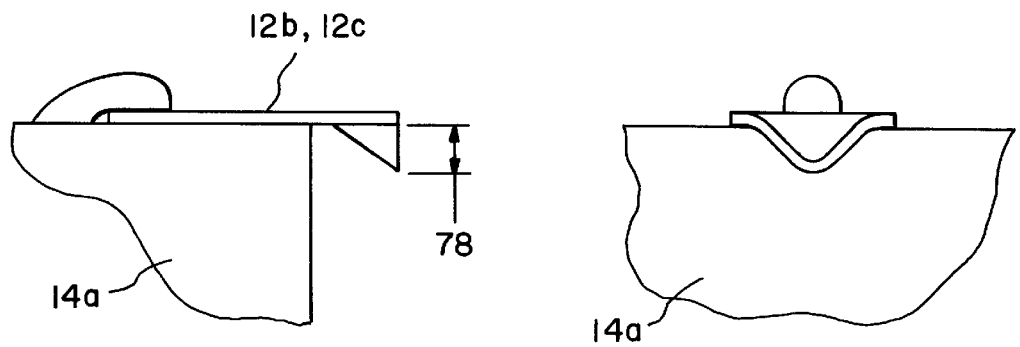
FIG. 22 is a diagrammatic view of the embodiment of FIG. 21 illustrating the deflection of the test element after laser peening with a single laser pulse.
Figure 21A:
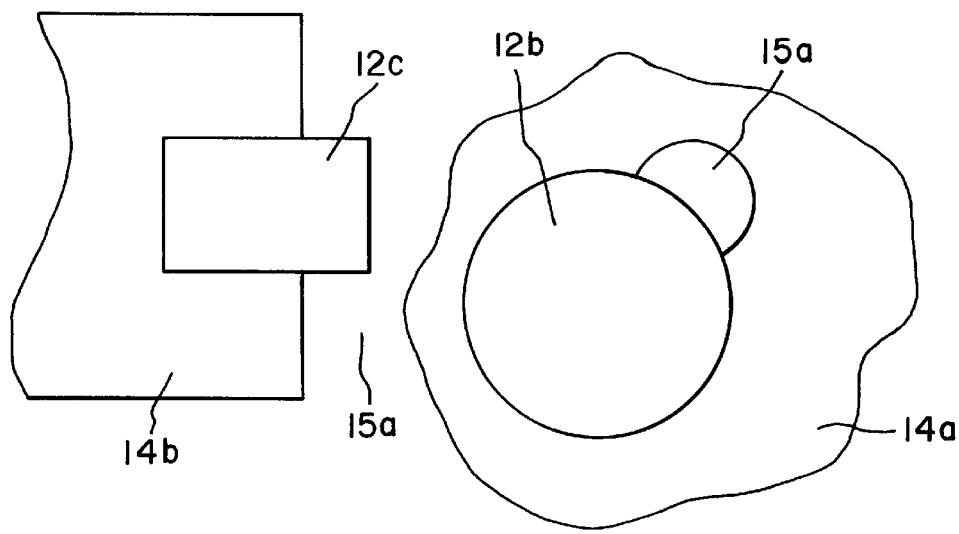
FIG. 21 is a diagrammatic view of another embodiment of the present invention incorporating a sheet-shaped test element within a base such that a portion of the test element extends over an edge of the base.
Figure 21B:
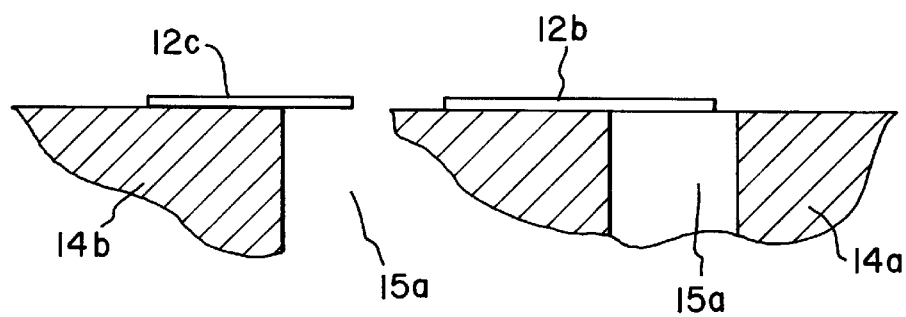

In another embodiment of the invention as shown in FIG. 21, the edge of a sheet type test element 12b, 12c is placed over a recess 15a in a support fixture 14a, 14b. The portion of the test element suspended over the recess 15a is placed in the anticipated path of the laser pulse. The deflection 78 resulting from the shock wave in test element 12b, 12c as shown in FIG. 22 is thereafter measured in the direction substantially perpendicular to and away from the impacted surface, and the deflection measurement is indicative of the magnitude of the impulse imparted by the laser pulse.

Figure 23:
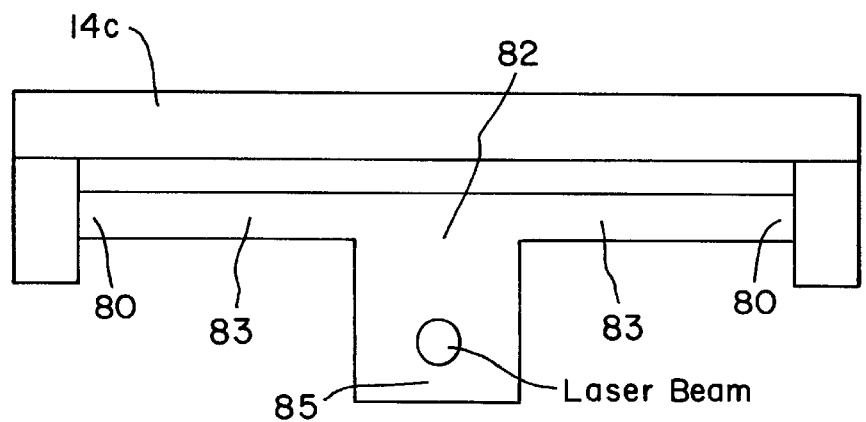
FIG. 23 is a diagrammatic view of another embodiment of the present invention incorporating a twist-type test element.
Figure 24:
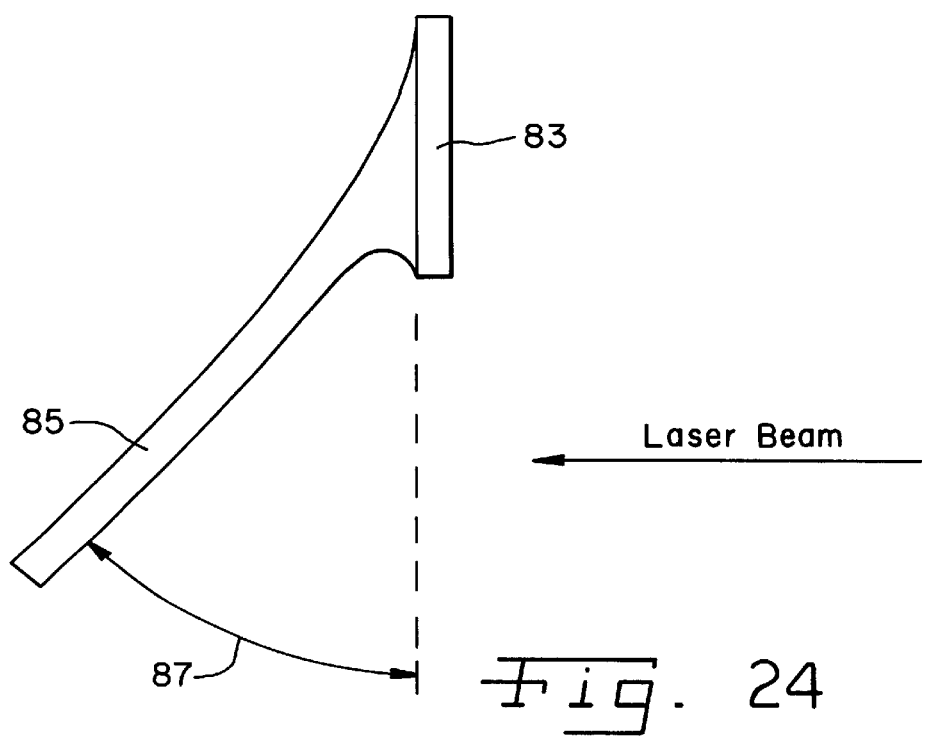
FIG. 24 is a diagrammatic side view of a measuring means for determining the angular twist of the twist-type test element of the present invention.

FIG. 23 shows a front view of a twist-type test element 82 used for measuring the magnitude of the resultant shock wave. The twist gauge 82 has the general shape of a "T" where the horizontal portion 83 of the "T" is long and narrow and the vertical section 85 is short and wide. The ends of the horizontal portion of the test element 80 are supported in a single support fixture 14c while the vertical section 85 extends outward from the middle of the horizontal portion 83. The vertical section 85 is placed in the anticipated path of the laser pulse. The deflection resulting from the shock wave, as shown in FIG. 24, is thereafter measured as an angular deflection 87 in the direction substantially perpendicular to and away from the impacted surface, and the measurement is indicative of the magnitude of the impulse imparted by the laser pulse. In this case, the angular deflection 87 in the test element is compared against previously designed data sets.

Figure 25:
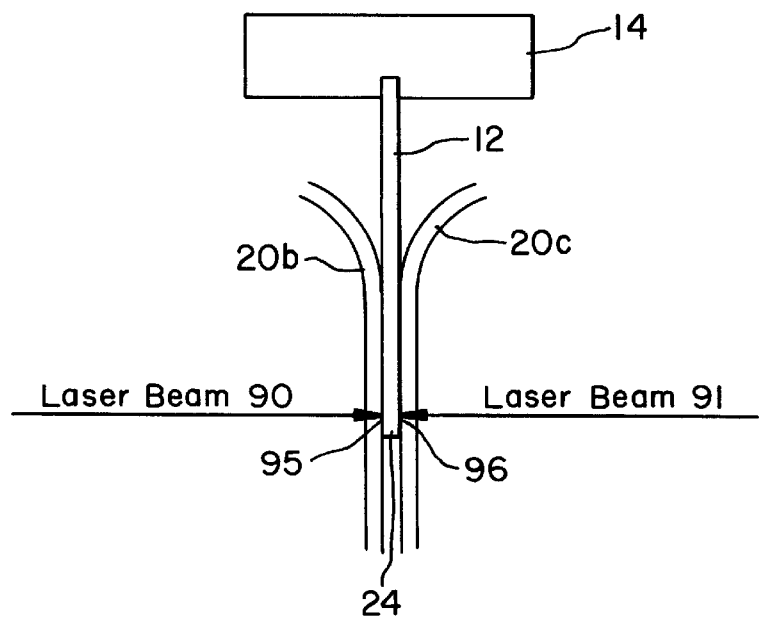
FIG. 25 is a diagrammatic view of another embodiment of the present invention incorporating a single strip test element for double-sided laser shock peening applications.

In yet another embodiment of the present invention, as shown in FIG. 25, a single test element 12 is mounted in fixture 14 and secured in the anticipated path of two opposed laser beams 90 and 91. A second overlay 20b and 20c may be applied to both sides 95 and 96 of the test element 12 and the thickness of each overlay 20b and 20c on opposite sides of the test element 12 may or may not be of the same thickness. The two opposed laser beams 90, 91, directed toward each other, are fired at substantially the same time wherein they may have substantially identical laser-beam parameters and arrive at the respective processing surface at substantially the same time. In this case, the test element 12 will be used to ensure similar processing conditions are created for the laser beams 90 and 91. A described previously and referring now to FIG. 1, a measuring means 16 may be used to measure the deflection at second end 24 of test element 12 to indicate potentially non-symmetric processing conditions between the two laser beams 90, 91, or a potentially significant difference in the arrival time of the two laser beams 90, 91 on the test element.

To demonstrate the effectiveness of this embodiment of the present invention, a plurality of test elements 12 of a selected thickness were placed in mounting means 14d, and a plurality of selected laser pulses having known laser beam metrics were directed at the second end of each test element 12. Each laser pulse from the laser beams 90 and 91 impacted sides 95 and 96, respectively, that was centered 4 millimeters from the end 24 of the test element. Each test element 12 was 6 millimeters wide by 100 millimeters long and 6 millimeters were gripped by mounting means 14. The deflection of the second end 24 was then measured by measuring means 16 and the results recorded.

Figure 26:
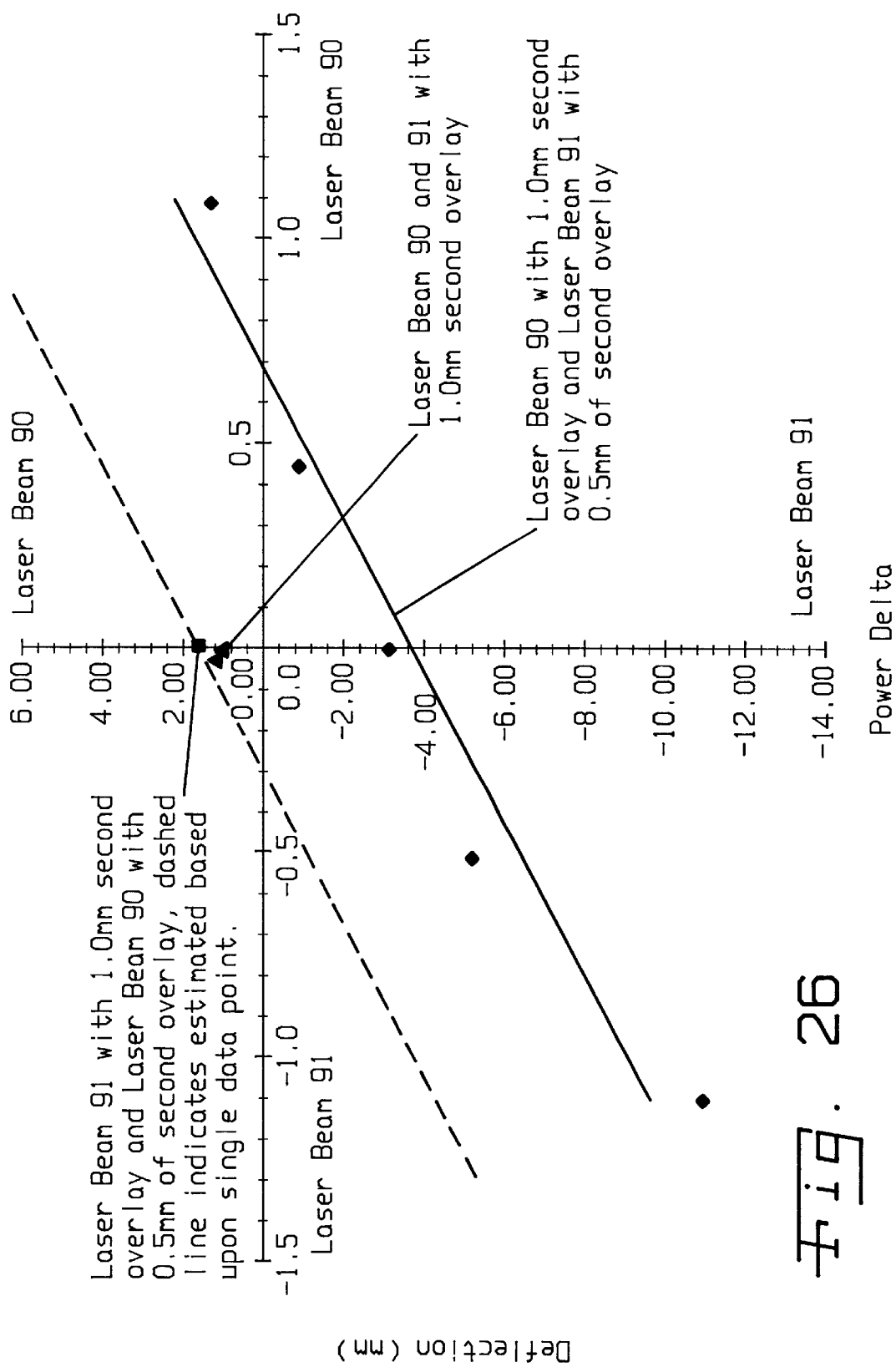
FIG. 26 is a graph showing the relationship between the difference in the power density between two laser pulses on opposite sides of a test element and deflection of the test element of FIG. 25, for a test element thickness of 1 millimeter, and a laser pulse width of 20 ns.

After measurement of the deflection of the test elements 12, a chart was plotted of the relationship between the difference in the applied laser power density of the laser beams 90 and 91 and the corresponding deflection. The data are shown in FIG. 26. Positive deflection was taken to be a deflection away from laser beam 91 and into laser beam 90 and a positive power density difference was taken to be a higher power density in laser beam 90 over laser beam 91. In addition, the effect of the difference of the second overlay thickness applied to each side 95 and 96 of the second end 24 of test element 12 is shown in FIG. 26. As can be seen in FIG. 26, a substantially linear relationship exists between the difference in the power densities and difference in second overlay thicknesses applied to each side of the test element 12.

It should be understood that although the testing outlined above only varied the power density and the second overlay thickness, other dimensional and geometrical variations are possible and will similarly affect the deflection relationship.

Figure 27:
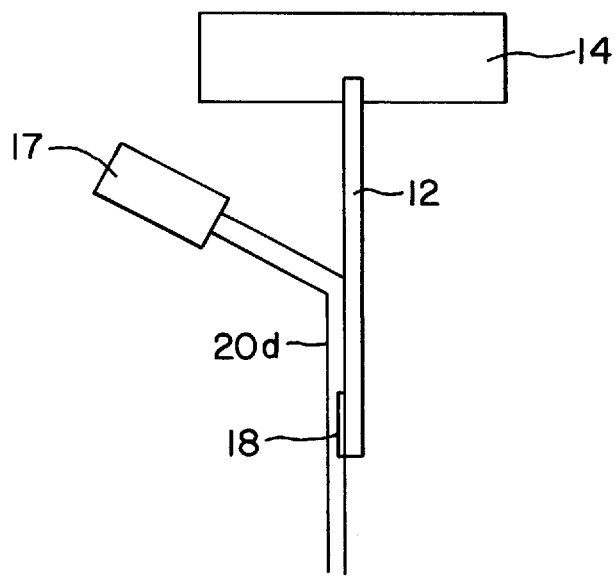
FIG. 27 is a diagrammatic view of another embodiment of the present invention incorporating a nozzle to apply a second overlay on the surface of a test element.

FIG. 27 shows the application of the second overlay 20*d* applied to the surface of test element 12 that has the first overlay 18 applied by another method. The first overlay 18 is opaque to the laser beam and is in contact with the test element 12, 12*b* while the second overlay 20*d*, transparent to the laser beam, is applied from overlay applicator 17. This second overlay 20*d* first contacts the test element 12 near its center and then flows over the first overlay 18. It has been determined that of critical importance, in one aspect of the invention, is monitoring and controlling the applied thickness of the second overlay 20*d* layer, typically water.

Figure 28:
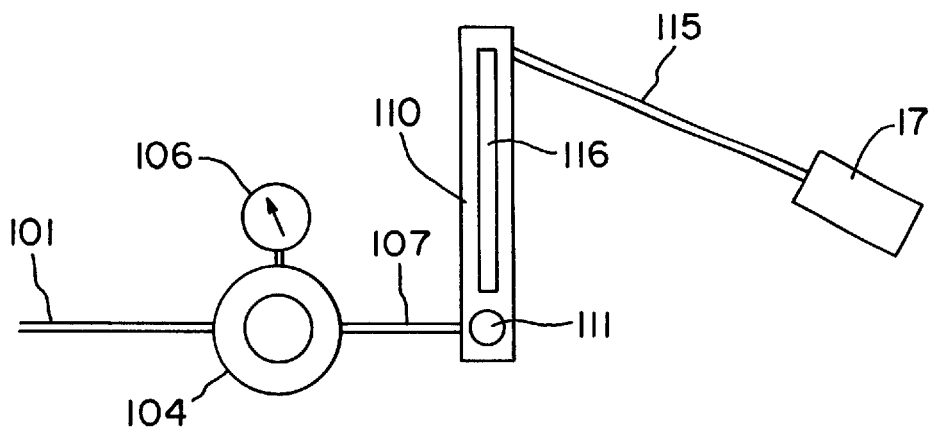
FIG. 28 is a diagrammatic view of another embodiment of the present invention incorporating a pressure regulator, pressure sensor, and flow meter with a flow valve to control the application of the overlay through a nozzle.

A means for accurately and reproducibility controlling the thickness and uniformity of the second overlay 20*d* is touse specific valves to control the pressure and/or flow rate of the second overlay 20*d*. Referring now to FIG. 28 the required control can be accomplished by using a mechanical pressure regulator 104 with pressure gauge 106 and a flow meter assembly 110 that contains a valve 111 with flow meter 116. The overlay water enters the inlet side 101 of the pressure regulator 104. The pressure of the overlay on the outlet side 107 of the pressure regulator 104 is maintained at a constant value prior to entering the flow meter assembly 110. The flow meter 116 with valve control 111 controls the flow rate of the second overlay 20*d* on the outlet side 115 prior to entering the overlay applicator head 17. A mechanical pressure regulator 104 may be that of Model DS05 that maintains a constant outlet pressure over a wide range of inlet supply pressure manufactured by Honeywell Incorporated of 1985 Douglas Drive North, Golden Valley, Minn. 55422, although other pressure regulators may be alternatively utilized. A flow rate meter assembly 111 with valve may be that of Model 9-03229-37 which is a 150-mm correlated flow meter with a high-resolution valve made by the Cole-Palmer Instrument Company of 625 East Bunker Court, Vernon Hills, Ill. 60061, although other flow meters may be alternatively utilized.

Figure 29:
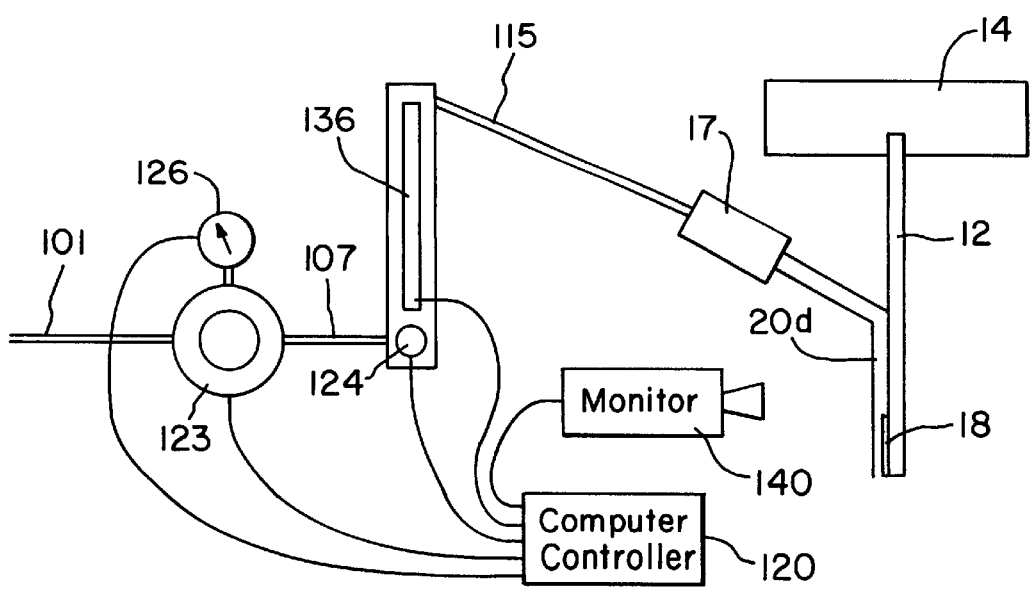
FIG. 29 is a diagrammatic view of another embodiment of the present invention incorporating a computer control system and monitor to control the thickness and uniformity of the second overlay.

In the preferred embodiment, as shown in FIG. 29, it is desired to control the pressure and flow rate utilizing a computer control system 120 to control a pressure servo valve 123 and a flow rate servo valve 124, in order to maintain the second overlay 20*d* to a substantially constant thickness and uniformity. Pressure sensors 126 and a flow rate meter 136 provide signals to the computer control system 120 in order to maintain the desired pressure and flow rate at applicator head 17. The computer operatively associated with monitor 140 to measure the water thickness or uniformity on test element 12, 12*b* during processing. If the monitor 140 detects that the thickness or uniformity of the second overlay 20*d* are outside the desired tolerance, the computer control system 120 makes an adjustment to the pressure servo valve 123 or flow servo valve 124 or both to obtain the proper thickness or uniformity.

Mechanisms to monitor the thickness and uniformity of the second overlay 20*d* fall into two types: contacting and non-contacting measurement devices. Contacting devices include utilizing a scale or other measurement device physically immersed in the second overlay 20*d* and in contact with the target surface of the test element. The second overlay 20*d* thickness can then be directly observed on the measuring device. Another type of contact measurement device is a dial indicator that is positioned to touch the surface of the overlay 20*d*, the thickness of the overlay being determined by the difference between the point of overlay 20*d* contact and the point of contact on the surface of the test element 12.

Non-contacting devices include utilizing optical means such as lasers or light beams to determine overlay thickness by sensing refraction or reflection of the laser beam and calculating the thickness of the overlay that gives such refraction or reflection. A device type may be that of LT-8110 laser displacement meter made by the Keyence Corporation of America of Woodcliff Lake, 50 Tice Boulevard, N.J. 07675, although other measurement instruments may be alternatively utilized. Equivalent and alternative mechanisms may utilize ultrasonic sensors to determine overlay thickness, such as by determining the time of flight difference of an acoustic wave propagating to the surface of the overlay layer and test element. Further other non-contacting mechanisms such as a video camera surveillance determining in-bound and out-of-bound thickness could be utilized. An alternate video mechanism includes comparing Moire Fringes in or on the overlay layer with known patterns to compute a water thickness and uniformity.

In the preferred embodiment, water is used as the second overlay and the pressure of the water ranges from 10 to 60 psi while the flow rate ranges from 0.01 to 1.00 gallons per minute.

Control of the overlay thickness and uniformity may also be developed through selecting appropriate overlay applicator head 17, using criteria of shape, size, orientation, and spray pattern. It has been determined that the thickness and uniformity of the second overlay 20*d* on the test element 12 will have an effect on the measurable deflection in the test element 12. The shape of the nozzle orifice of applicator head 17, such as round, oval, or square will affect the dispersal pattern of the second overlay 20*d* and thus thickness and uniformity of the second overlay 20*d* on the surface of the test element 12. The size and shape of the opening of the applicator nozzle will also affect the thickness and uniformity of the second overlay 20*d* as it flows over the surface of the test element 12. In the preferred embodiment the nozzle orifice is round with a diameter of 0.25-inch and is model H1/4U 0040 brass made by Spray Systems Company of Chicago, Ill., although other nozzles may be alternatively utilized.

Figure 30:
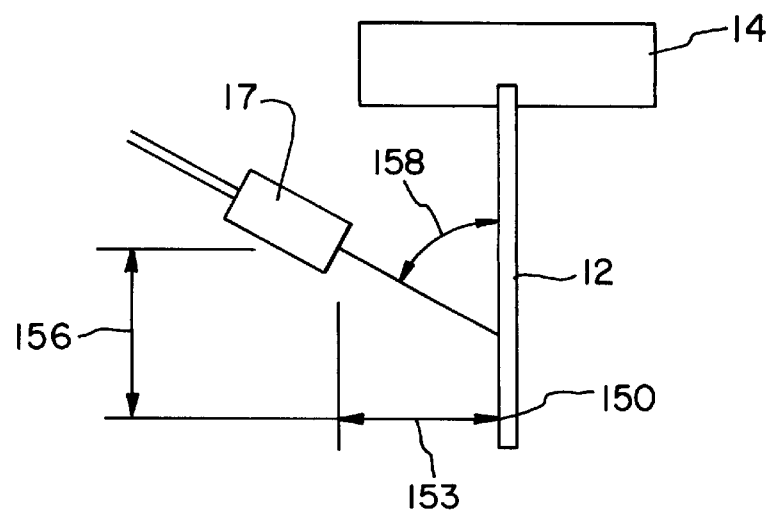
FIG. 30 is a diagrammatic view of another embodiment of the present invention illustrating the position of the overlay nozzle relative a test element.

FIG. 30 shows a view of the water applicator head 17 relative to the surface of the test element 12. The position of the nozzle of the applicator head 17 relative to the surface of test element in conjunction with the water pressure and flow rate affects the thickness and uniformity of the water overlay over the laser impact area 150. The key elements of the position of the applicator head 17 are the stand-off distance of the nozzle from the test element 153 which is the distance between the center of the face of the nozzle and the nearest surface of the test element 12, 12b, the height 156 of the nozzle from the laser impact area 150 which is the distance between the center of the nozzle face and the center of the laser impact area 150, and the angle 158 of the major axis of the applicator head relative to the surface of the test element. The distances and angle used to apply a specific thickness are dependent upon the pressure and flow rate of the overlay, but generally the stand-off distance ranges from 0.25 to 2.00 inches, the height from the laser impact area ranges from 0.25 to 2.00 inches, and the angle of the nozzle ranges from 10 to 80 degrees.

It is known that dielectric breakdown occurs at decreasing power densities as the purity of the water overlay decreases. Typically, three types of overlay water are used; filtered house water provided by a public water supply, distilled water and deionized water. Filtered house water typically has particulates removed by a filtration method. It will still contain smaller particulates that passed through the filters and will have ions and chemical contaminates that may contribute to early onset of dielectric breakdown in the water. Distilled water has all the particulates removed, but contains an imbalance of ions that may also contribute to dielectric breakdown. When using deionized water with a resistivity as high as 18 mega-ohms (MΩ), only the water molecules themselves can initiate dielectic breakdown. The use of higher quality water can change the response of the test elements at higher power densities and reduce the scatter in the measure deflection values.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A gauge for ensuring the proper operation of a laser shock peening system, said gauge comprising:
    a test element; and
    a mounting means for mounting said test element such that a portion of said test element is in the anticipated path of a single laser pulse;
    wherein said test element sustains a deflection in the direction substantially perpendicular to the surface of said test element when subjected to said single laser pulse, said deflection being indicative of the magnitude of the impulse delivered by said single laser pulse.

2. The gauge of claim 1, wherein said deflection is a function of laser pulse duration, laser pulse energy density, transparent overlay thickness, shock wave magnitude, the distance of the laser pulse impact point from said mounting means, and test element material dimensions and composition.

3. The gauge of claim 1, wherein said test element is a strip.

4. The gauge of claim 1 wherein said test element further includes a transparent overlay applied thereto.

5. The gauge of claim 3, wherein said test element has a first end and a second end, said first end being supported by said mounting means and said second end being in the anticipated path of the laser pulse.

6. The gauge of claim 3, wherein said deflection is defined by the functional relationship:

$$Df=f[Ti, E, A, Ma, Di, Po, Wt]$$

where:
    Df=Measurable deflection of said test element;
    Ti=Duration of said single laser pulse;
    E=Energy of said single laser pulse;
    A=Area impacted by said single laser pulse;
    Ma=Shock wave magnitude;
    Di=Dimensions of the test element; and
    Po=Positioning of the test element in said mounting means with respect to the single laser pulse;
    Wt=Thickness of said transparent overlay.

7. The gauge of claim 1, wherein said test element is a sheet.

8. The gauge of claim 7, wherein said mounting means comprises a base having a recess.

9. The gauge of claim 8, wherein said test element is in contact with said base and a portion of said test element is positioned over said recess, said portion being in the anticipated path of the laser pulse.

10. The gauge of claim 8, wherein said deflection is defined by the functional relationship:

$$Df=f[Ti, E, A, Ma, Ap, Th, Wt]$$

where:
    Df=Measurable deflection of said test element;
    Ti=Duration of said single laser pulse;
    E=Energy of said single laser pulse;
    A=Area impacted by said single laser pulse;
    Ma=Shock wave magnitude;
    Ap=Dimension of said recess; and
    Th=Thickness of the test element;
    Wt=Thickness of said transparent overlay.

11. The gauge of claim 1, further comprising a measuring means for measuring the deflection in said test element.

12. The gauge of claim 1 wherein said test element is metallic.

13. The gauge of claim 1 further comprising an automated measurement means for determining the deflection of said test element.

14. The gauge of claim 13 wherein said automated measurement means comprises a laser-based position-measuring device.

15. The gauge of claim 13 wherein said automated measurement means comprises an electrical-contact-based positioning device.

16. The gauge of claim 14 wherein said device is operatively associated with said laser shock peening system.

17. The gauge of claim 4 further comprising a controlling means for controlling the thickness of said transparent overlay.

18. The gauge of claim 17 wherein said controlling means is a pressure regulator.

19. The gauge of claim 17 wherein said controlling means is a flow valve.

20. The gauge of claim 4 further comprising a monitoring means for monitoring the thickness of said transparent overlay.

21. The gauge of claim 20 wherein said monitoring means is a monitor selected from: scale, dial indicator, laser beam, ultrasonic, or video.

22. The gauge of claim 21 wherein said monitor provides a feedback signal to a controller, said controller operatively associated with the transparent overlay applicator.

23. An assembly in association with a laser shock peening system, said assembly comprising:

a test element; and a means to dispose said test element relative to said laser shock peening system such that said test element operatively receives laser energy from said laser shock peening system at a test element surface and thereby experiences a deflection in a direction substantially perpendicular to said test element surface.

24. An assembly in association with a laser shock peening system, said assembly comprising:

a support assembly; and a test element operatively supported by said support assembly, said test element being responsive to operative irradiation of a surface thereof by a laser pulse from said laser shock peening system to displace in a direction substantially perpendicular to the irradiated test element surface.

25. A system comprising:

a test element; and a laser shock peening system, said laser shock peening system being configured to operatively irradiate a surface of said test element and thereby induce defelection of said test element in a direction substantially perpendicular to the irradiated test element surface.

* * * * *